United States Patent
Nakata

(10) Patent No.: US 10,929,299 B2
(45) Date of Patent: Feb. 23, 2021

(54) STORAGE SYSTEM, METHOD AND NON-TRANSITORY COMPUTER-READABLE STORAGE MEDIUM

(71) Applicant: FUJITSU LIMITED, Kawasaki (JP)

(72) Inventor: Yasuyuki Nakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 16/004,479

(22) Filed: Jun. 11, 2018

(65) Prior Publication Data

US 2018/0365159 A1    Dec. 20, 2018

(30) Foreign Application Priority Data

Jun. 15, 2017   (JP) .............................. JP2017-117715

(51) Int. Cl.
G06F 12/10    (2016.01)
G06F 3/06    (2006.01)

(52) U.S. Cl.
CPC ............ G06F 12/10 (2013.01); G06F 3/0608 (2013.01); G06F 3/0641 (2013.01); G06F 3/0683 (2013.01); G06F 2212/1044 (2013.01); G06F 2212/657 (2013.01)

(58) Field of Classification Search
CPC ... G06F 16/1748–1756; G06F 11/1453; G06F 3/0641; G06F 3/0608; G06F 3/0638
See application file for complete search history.

(56) References Cited

U.S. PATENT DOCUMENTS 8,140,821 B1 *  3/2012  Raizen ................ G06F 11/1448
                                                    707/637
9,772,789 B1 *  9/2017  Natanzon ................ G06F 3/067
2008/0082744 A1  4/2008  Nakagawa
2013/0036277 A1 *  2/2013  Szczepkowski ..... G06F 12/0811
                                                    711/159
2013/0086007 A1 *  4/2013  Bandopadhyay ... G06F 16/1748
                                                    707/692
2013/0218851 A1  8/2013  Yamakawa
2013/0268498 A1 *  10/2013  Sisco .................. G06F 16/1727
                                                    707/692
2015/0058301 A1 *  2/2015  Kolodner ............ G06F 16/1748
                                                    707/692
2018/0039423 A1  2/2018  Yoshii et al.

FOREIGN PATENT DOCUMENTS

JP    2008-84270    4/2008
WO    2012/053152    4/2012
WO    2016/181479    11/2016

* cited by examiner

Primary Examiner — Reginald G Bragdon
Assistant Examiner — Curtis James Kortman
(74) Attorney, Agent, or Firm — Fujitsu Patent Center

(57) ABSTRACT

A storage system includes a storage device, and a processor configured to store first data in the storage device, receive second data, specify a first data size in accordance with a second data size of the second data, divide the first data into a plurality of first blocks each having the specified first data size, divide the second data into a plurality of second blocks each having the specified first data size, and store, in the storage device, data included in a block of the plurality of second blocks, while data included in another block of the plurality of second blocks is not stored in the storage device, wherein the data of the block is not identical to data of any of the plurality of first blocks, and the data of the another block is identical to data of any of the plurality of first blocks.

15 Claims, 19 Drawing Sheets

~205

| I/O SIZE | ROUNDED-UP SIZE | DIVISION SIZE |
|---|---|---|
| 0.5KB~ 4KB | 4KB | 4KB |
| 4.5KB~ 8KB | 8KB | 8KB |
| 7.5KB~12KB | 12KB | 8KB+4KB |
| 12.5KB~16KB | 16KB | 16KB |
| 16.5KB~20KB | 20KB | 16KB+4KB |
| 20.5KB~24KB | 24KB | 16KB+8KB |
| 24.5KB~28KB | 28KB | 16KB+8KB+4KB |
| 28.5KB~32KB | 32KB | 32KB |

| VALUE | MAGNIFICATION | DATA SIZE |
|---|---|---|
| 0 | ONE | 4KB |
| 1 | TWO | 8KB |
| 2 | FOUR | 16KB |
| 3 | EIGHT | 32KB |

| I/O SIZE | ROUNDED-UP SIZE | DIVISION SIZE |
|---|---|---|
| 0.5KB~ 4KB | 4KB | 4KB |
| 4.5KB~ 8KB | 8KB | 8KB |
| 7.5KB~12KB | 12KB | 8KB+4KB |
| 12.5KB~16KB | 16KB | 16KB |
| 16.5KB~20KB | 20KB | 16KB+4KB |
| 20.5KB~24KB | 24KB | 16KB+8KB |
| 24.5KB~28KB | 28KB | 16KB+8KB+4KB |
| 28.5KB~32KB | 32KB | 32KB |

| VALUE | MAGNIFICATION | DATA SIZE |
|---|---|---|
| 1 | ONE | 4KB |
| 2 | TWO | 8KB |
| 3 | THREE | 16KB |
| 4 | FOUR | 32KB |
| 5 | FIVE | 4KB |
| 6 | SIX | 8KB |
| 7 | SEVEN | 16KB |
| 8 | EIGHT | 32KB |

STORAGE SYSTEM, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-117715, filed on Jun. 15, 2017, the entire contents of which are incorporated herein by reference.

FIELD

The embodiment discussed herein is related to a storage system, a method and a non-transitory computer-readable storage medium.

BACKGROUND

In deduplication of identical copies of data, data is divided, for example, by fixed size of 4 kilobytes (KB), and the identical copies of data are managed in one slot. Then, deduplicated data may be compressed to have a further reduced data amount.

Deduplication control may be performed by holding a table including a list of slots of 4 KB for the LBAs of volumes (also referred to as a "user volume", a "logical volume", or an "LU") accessed from a server. "LU" stands for a logical unit. "LBA" stands for a logical block address.

FIG. 1 is a diagram exemplarily illustrating a volume configuration of a storage apparatus in a conventional example.

In the present example, two pools 1000 (also referred to as a "pool #0" and a "pool #1") are loaded on the storage apparatus (not illustrated). Each pool 1000 includes one or more LUs 1001.

In FIG. 1, the pool #0 includes four LUs 1001 denoted by LUN0 to LUN3, and the pool #1 includes three LUs 1001 denoted by LUN10 to LUN12. "LUN" stands for a logical unit number.

Deduplication may be performed in the unit of the pool 1000. Specifically, deduplication may be performed among the different LUs 1001 in the same pool 1000. In the example illustrated in FIG. 1, deduplication is performed among the four LUs 1001 of LUN0 to LUN3 in the pool #0, and deduplication is performed among the threes LU 1001 of LUN10 to LUN12 in the pool #1.

The size of input/output (I/O) data from a server and the unit of deduplication depend on settings of the server and the data content of a volume in some cases. Thus, an optimum slot size is different between volumes in some cases. Related techniques are disclosed in, for example, International Publication Pamphlet Nos. WO 2016/181479 and WO 2012/053152, and Japanese Laid-open Patent Publication No. 2008-84270.

SUMMARY

According to an aspect of the invention, a storage system includes a storage device, and a processor coupled to the storage device and configured to store first data in the storage device, receive second data, specify a first data size in accordance with a second data size of the second data, divide the first data into a plurality of first blocks each having the specified first data size, divide the second data into a plurality of second blocks each having the specified first data size, and store, in the storage device, data included in a block of the plurality of second blocks, while data included in another block of the plurality of second blocks is not stored in the storage device, wherein the data of the block is not identical to data of any of the plurality of first blocks, and the data of the another block is identical to data of any of the plurality of first blocks.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram exemplarily illustrating a slot size table in the exemplary embodiment;

FIG. 9 is a diagram illustrating an exemplary slot division table in the exemplary embodiment;

FIG. 19 is a diagram exemplarily illustrating a slot size table in a modification of the exemplary embodiment.

DESCRIPTION OF EMBODIMENT

Figure 1:
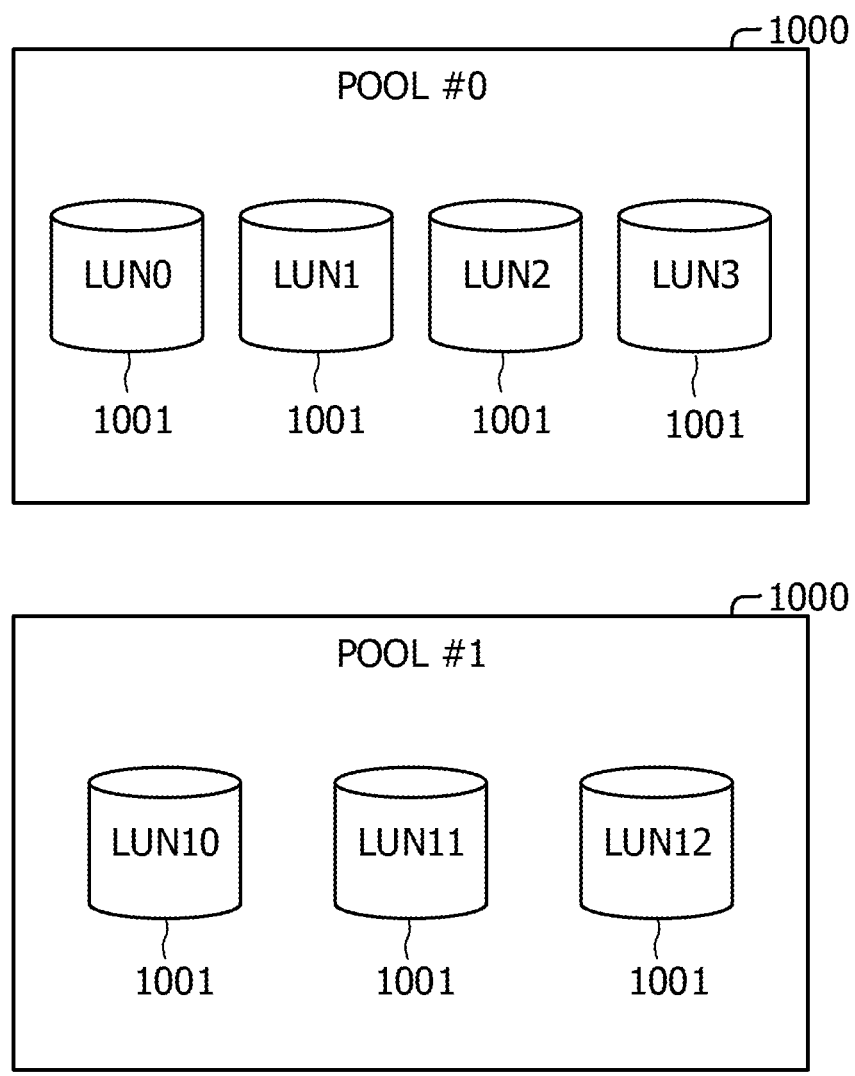
FIG. 1 is a diagram exemplarily illustrating a volume configuration of a storage apparatus in a conventional example.

When the unit (also referred to as a "slot size") of deduplication is 4 KB, I/O data from a server is divided into blocks each having 4 KB. Thus, when the size of I/O data is large, the number of divided blocks is large, which potentially leads to degraded processing performance at a storage apparatus. For example, I/O data of 32 KB is divided into eight blocks of 4 KB.

When the slot size is increased from 4 KB, the number of divided data blocks decreases. For example, when the slot size is 16 KB, I/O data of 32 KB is divided into two blocks.

When the slot size is increased, however, I/O of data in a data size (for example, 4 KB) smaller than the slot size issued from the server is accompanied by merge processing in data writing. This potentially leads to degraded processing performance at the storage apparatus. The merge processing is performed by, for example, reading data of 16 KB already stored in a volume and merging the data with newly written data of 4 KB.

When there are many duplication copies of data having a data size (for example, 4 KB) smaller than the slot size (for example, when there are a large number of copies of I/O data which are duplicate in the unit of 4 KB but are not in the unit of 16 KB), a duplication rate decreases. This potentially leads to a decreased data compression ratio in a volume of the storage apparatus.

Each of the accompanying drawings is not intended to provide such limitation that only components illustrated in the drawing are provided, but any other function or the like may be provided in addition.

In the drawings, any identical parts are denoted by an identical reference sign, and any repetitive description thereof will be omitted in the following.

[A] Related Art

Figure 2:
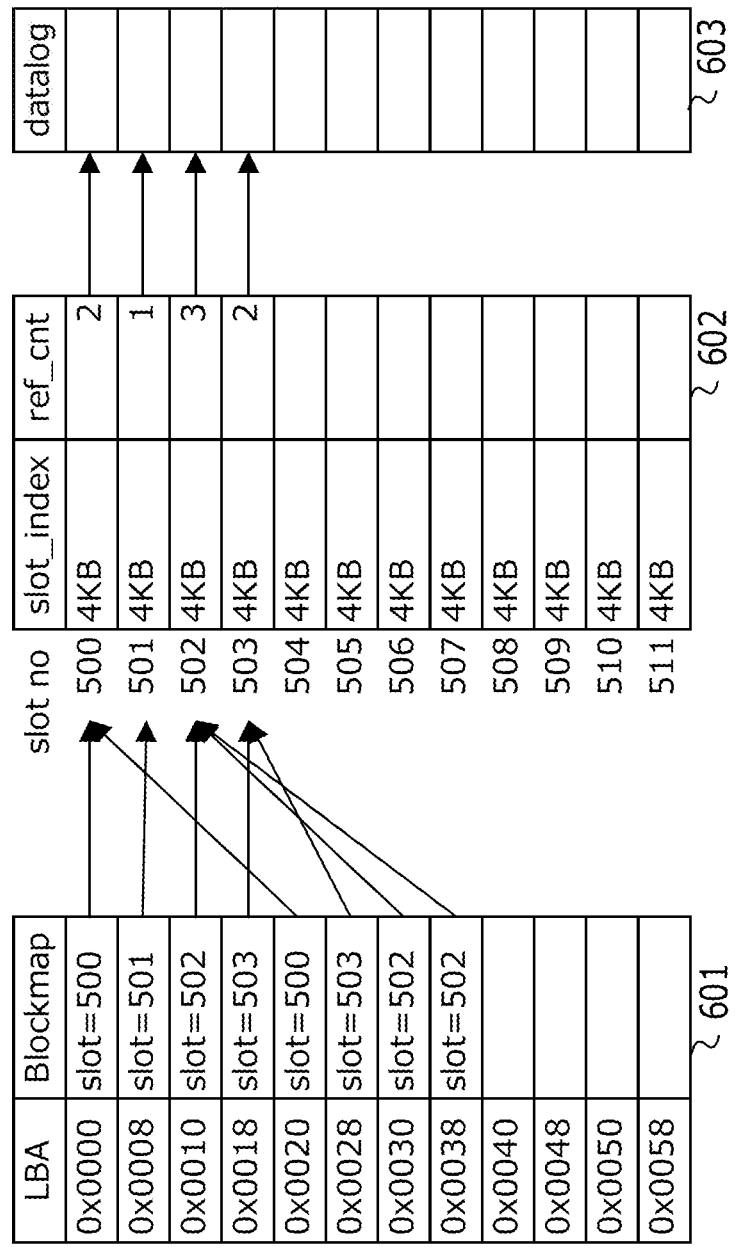
FIG. 2 is a diagram illustrating exemplary block mapping in a related example.

FIG. 2 is a diagram illustrating exemplary block mapping in a related example.

A storage apparatus (not illustrated) in the related example manages an address conversion table (also referred to as a "mapping table") 601, a slot management table 602, and an actual data table 603.

In the address conversion table 601, each LBA having a predetermined data size (for example, 4 KB) is associated with a slot number of a user volume. In the illustrated example, each LBA has a size of 512 bytes (in other words, 8 LBA has a size of 4 KB), the LBAs of 0x0000 to 0x005F are divided in 4 KB, and a slot number (refer to "blockmap" in FIG. 2) is allocated to each division. For example, slot=500 is allocated to the range of LBA=0x0000 to 0x0007, and slot=501 is allocated to the range of LBA=0x0008 to 0x000F.

The storage apparatus accesses to the user volume in the LBA unit (also referred to as the "block unit") of a predetermined data size.

In the slot management table 602, a slot size (refer to "slot_index" in FIG. 2) and a reference counter value (refer to "ref_cnt" in FIG. 2) are associated with each other for each slot number (refer to "slot no" in FIG. 2). The "reference counter value" is also referred to as a "reference value" or a "duplication data number". In FIG. 2, the slot size is set to be 4 KB for all slots of slot=500 to 511 listed in the slot management table 602.

The reference counter value indicates the number of blocks pointing to a corresponding slot number in the address conversion table 601. In FIG. 2, slot=500 is pointed by two blocks of LBA=0x0000 to 0x0007 and 0x0020 to 0x0027, and thus has a reference counter value set to be two. Slot=501 is pointed by one block of LBA=0x0008 to 0x000F, and thus has a reference counter value set to be one.

In other words, any identical pieces of data are collectively managed with one slot, and any slot having duplicate data content is pointed by multiple block maps.

When a pointing destination is changed from the address conversion table 601 to the slot management table 602 through data update, the reference counter value of a slot number pointed before the data update is decremented by one. Data of a slot, the reference counter value of which is changed to zero is recognized as a deletion target.

The actual data table 603 records data divided in the predetermined data size (for example, 4 KB) (refer to "datalog" in FIG. 2).

[B] Exemplary Embodiment

[B-1] Exemplary System Configuration

Figure 3:
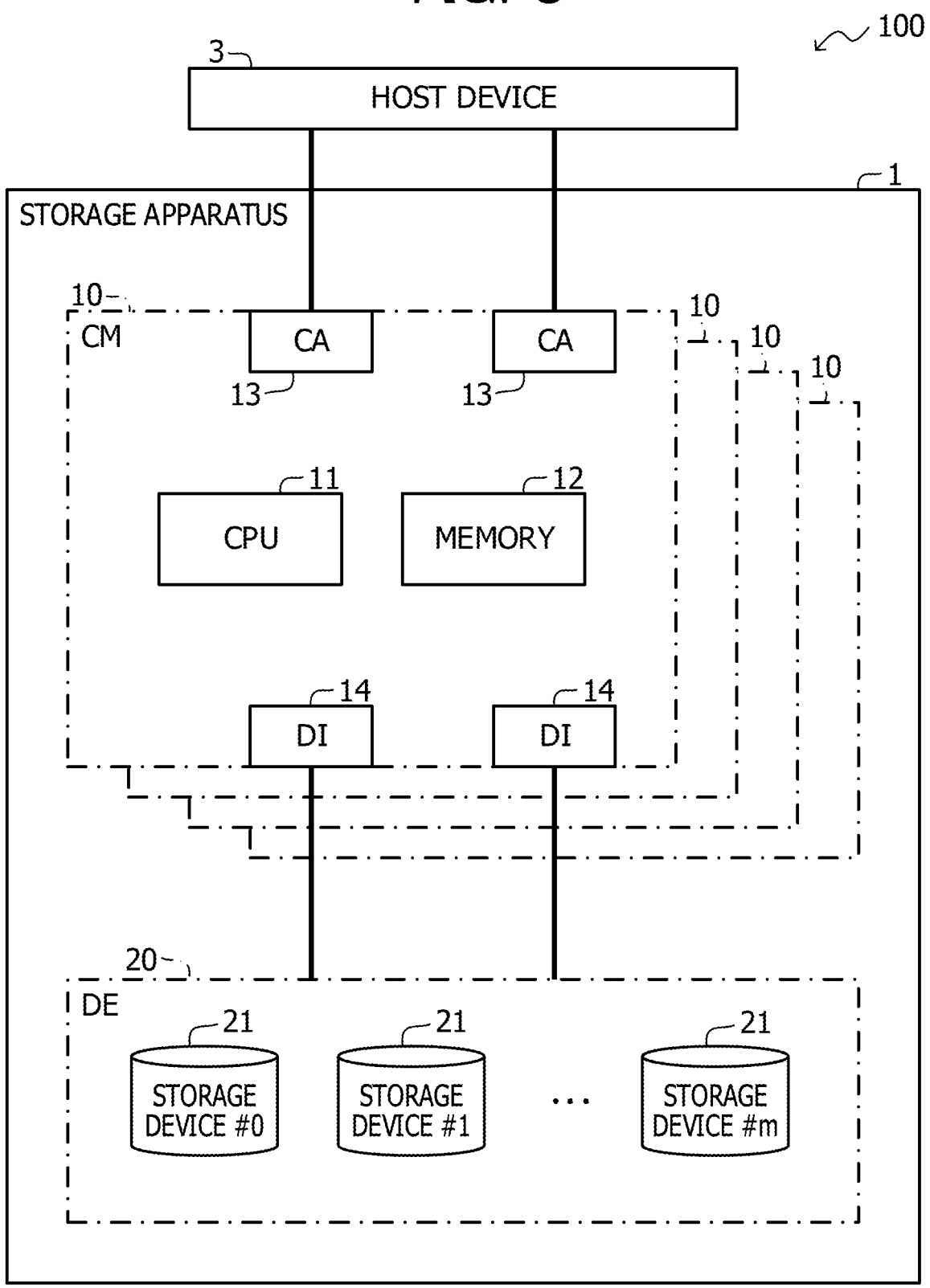
FIG. 3 is a diagram illustrating a hardware configuration of a storage system in an embodiment.

In an exemplary embodiment, the slot size, which is set to a fixed length (in other words, "predetermined data size") of 4 KB in the related example illustrated in FIG. 2, has a variable length in accordance with the size (in other words, a "data length") of I/O data from a host device 3 (refer to FIG. 3).

FIG. 3 is a diagram illustrating a hardware configuration of a storage system 100 in the exemplary embodiment.

For example, the storage system 100 includes a storage apparatus 1 and the host device 3 and provides a storage region to the host device 3.

The host device 3 is an exemplary higher-level device, and is, for example, a computer having a server function. Although the storage system 100 includes the single host device 3 in the example illustrated in FIG. 3, the number of host devices 3 included in the storage system 100 may be changed to any number.

The storage apparatus 1 includes multiple storage devices 21 to be described later and is configured to provide a storage region to the host device 3. The storage apparatus 1 stores data in the multiple storage devices 21 in a distributed or redundant state by using, for example, redundant arrays of inexpensive disks (RAID). For example, the storage apparatus 1 includes multiple (in the illustrated example, four) of CMs 10 and a disk enclosure (DE) 20.

For redundancy, the DE 20 is coupled with the multiple CMs 10 through multiple access paths to perform communication therebetween, and includes the plurality (in the illustrated example, m+1) of storage devices 21 (also referred to as "storage devices #0 to #m").

Each storage device 21 is an exemplary storage unit configured to store data in a readable and rewritable manner, and may be achieved by, for example, a hard disk drive (HDD), a solid state drive (SSD), or a storage class memory (SCM).

Each CM 10 is an exemplary storage control device configured to perform various kinds of control in accordance with a storage access request (also referred to as an "access control signal" or an "I/O data") from the host device 3. For example, the CM 10 includes a central processing unit (CPU) 11, a memory 12, multiple (in the illustrated example, two) of communication adaptors (CA) 13, and multiple (in the illustrated example, two) of drive interfaces (DI) 14. Since the four CMs 10 illustrated in FIG. 3 have identical configurations, FIG. 3 illustrates the configuration of one of the four CMs 10 and omits illustration of the configurations of the other CMs 10.

Each CA 13 is an interface configured to couple the host device 3 with the storage apparatus 1 to perform communication therebetween. The CA 13 is, for example, a channel adapter. Although each CM 10 includes the two CAs 13 in the example illustrated in FIG. 3, the present disclosure is not limited thereto. The CM 10 may include one, or three or more of the CAs 13.

Each DI 14 is an interface configured to couple the CM 10 with the DE 20 to perform communication therebetween, and is, for example, a fiber channel (FC) adapter. The CM 10 writes and reads data to and from the storage devices 21 through the DI 14. Although the CM 10 includes the two DIs 14 in the example illustrated in FIG. 3, the present disclosure is not limited thereto. The CM 10 may include one, or three or more of the DIs 14.

For example, the memory 12 is a storage device including a read only memory (ROM) and a random access memory (RAM). The ROM of the memory 12 may store a computer program such as a basic input/output system (BIOS). Any software program in the memory 12 may be read and executed by the CPU 11 as appropriate. The RAM of the memory 12 may be used as a primary record memory or a working memory.

For example, the CPU 11 is a processing device configured to perform various kinds of control and calculation and achieve various kinds of functions by executing an operating system (OS) and a computer program stored in the memory 12. Specifically, as described later with reference to FIG. 4, the CPU 11 may function as a deduplication control unit 40, a CA control unit 47, a cache control unit 48, a RAID control unit 49, and a DI control unit 50.

Any computer program for achieving the functions of the deduplication control unit 40, the CA control unit 47, the cache control unit 48, the RAID control unit 49, and the DI control unit 50 may be recorded and provided in a computer-readable recording medium. The computer-readable recording medium may be, for example, a flexible disk, a CD, a DVD, a Blu-ray Disc, a magnetic disk, an optical disk, and a magneto optical disc. The CD may be, for example, a CD-ROM, a CD-R, or a CD-RW. The DVD may be, for example, a DVD-ROM, a DVD-RAM, a DVD-R, a DVD+R, a DVD-RW, a DVD+RW, or a HD DVD. A computer (in the present exemplary embodiment, the CPU 11) may read the computer program from the above-described recording medium through a reading device (not illustrated), transfer the program to an internal recording device or an external recording device, and store the program therein for use. Alternatively, the computer program may be recorded in a storage device (also referred to as a "recording medium") such as a magnetic disk, an optical disk, or a magneto optical disc, and provided from the storage device to the computer through a communication path.

The functions of the deduplication control unit 40, the CA control unit 47, the cache control unit 48, the RAID control unit 49, and the DI control unit 50 may be achieved by the computer executing a control program stored in a storage device. In the present exemplary embodiment, the "internal storage device" may be the memory 12, and the "computer" may be the CPU 11. Alternatively, the control program may be recorded in the recording medium and read and executed by the computer.

For example, the CPU 11 controls operation of the entire CM 10. A device for controlling operation of the entire CM 10 is not limited to the CPU 11, but may be, for example, any one of an MPU, a DSP, an ASIC, a PLD, and a FPGA. Alternatively, the device for controlling operation of the entire CM 10 may be a combination of two or more kinds of devices among a CPU, an MPU, a DSP, an ASIC, a PLD, and a FPGA. "MPU" stands for Micro Processing Unit, "DSP" stands for Digital Signal Processor, and "ASIC" stands for Application Specific Integrated Circuit. "PLD" stands for Programmable Logic Device, and "FPGA" stands for Field Programmable Gate Array.

Figure 4:
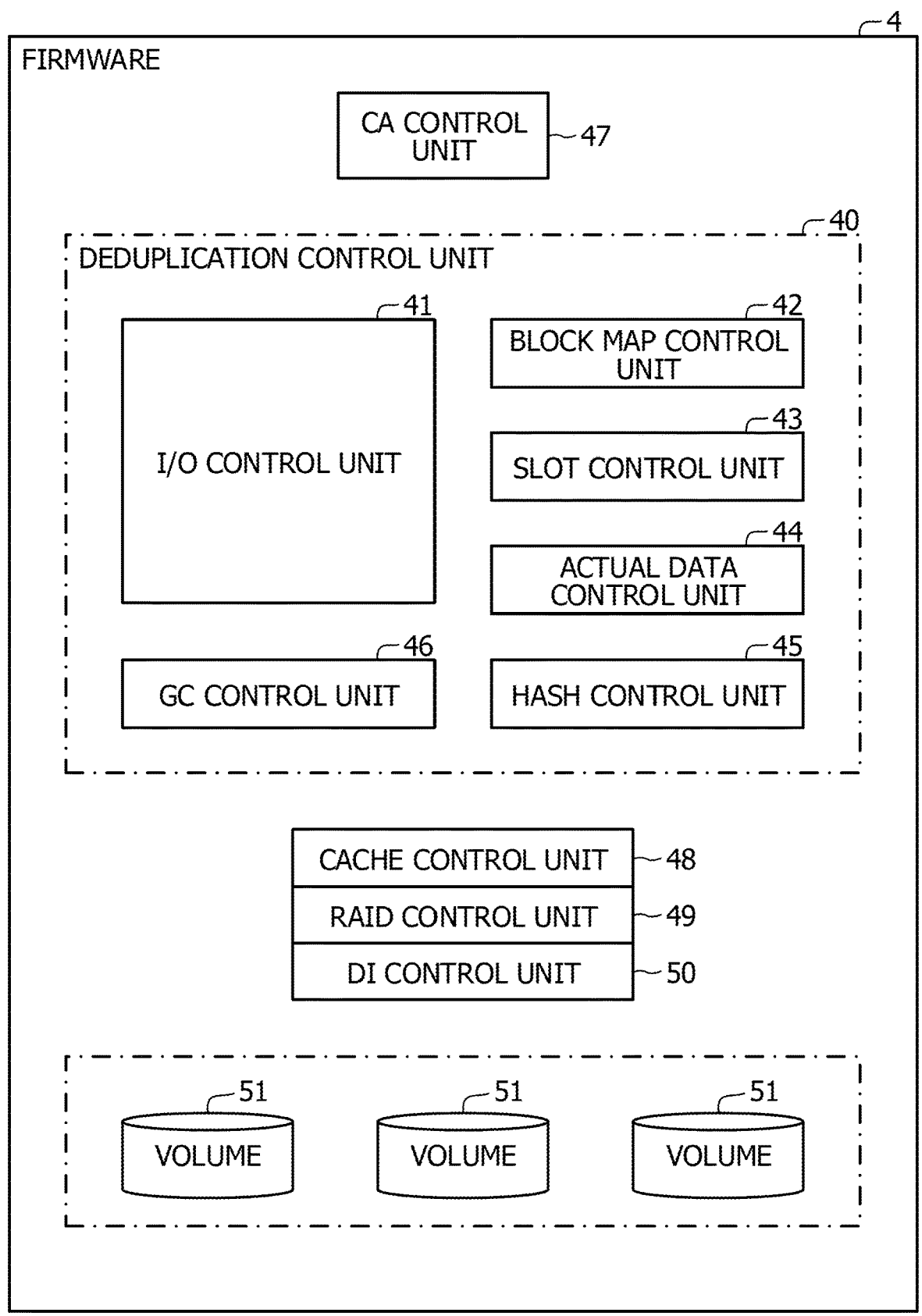
FIG. 4 is a diagram illustrating a firmware configuration of a controller module (CM) in the exemplary embodiment.

FIG. 4 is a diagram illustrating a firmware configuration of each CM 10 in the exemplary embodiment.

For example, a firmware 4 functions as the deduplication control unit 40, the CA control unit 47, the cache control unit 48, the RAID control unit 49, and the DI control unit 50. The firmware 4 recognizes multiple (in the illustrated example, three) of volumes 51.

The CA control unit 47 controls command transmission and reception between the CA 13 and the host device 3.

The cache control unit 48 performs cache control by temporarily holding data in the memory 12 of the CM 10.

The RAID control unit 49 controls a RAID group.

The DI control unit 50 controls command transmission and reception between the DI 14 and the volumes 51.

The deduplication control unit 40 does not write duplication data in the volumes 51. For example, the deduplication control unit 40 functions as an I/O control unit 41, a block map control unit 42, a slot control unit 43, an actual data control unit 44, a hash control unit 45, and a garbage collection (GC) control unit 46.

The I/O control unit 41 controls the entire I/O related to deduplication.

The block map control unit 42 manages block maps by using an address conversion table 202 to be described later with reference to, for example, FIG. 6.

The slot control unit 43 manages slots by using a slot management table 203 to be described later with reference to, for example, FIG. 6.

The actual data control unit 44 controls storage and reading of data subjected to deduplication and compression.

The hash control unit 45 performs deduplication determination by using a hash value.

The GC control unit 46 deletes unnecessary data in the volumes 51 by, for example, garbage collection.

FIG. 5 is a diagram exemplarily illustrating a slot size table 201 in the exemplary embodiment.

The slot size table 201 lists any slot size usable in block mapping at the CM 10.

The slot size table 201 is set based on the size of each region in which LBAs are managed in the address conversion table 202 to be described later with reference to, for example, FIG. 6. In FIG. 6, LBAs are managed in 4 KB, in other words, the management unit of LBAs is 4 KB, and thus each "data size" in the slot size table 201 illustrated in FIG. 5 is $4 \times 2^n$ KB (n is an integer). As illustrated in FIG. 5, the range of values taken by n may be restricted by providing an upper limit value (in the illustrated example, 32 KB) to the data size (in the illustrated example, n=0, 1, 2, and 3). The integer n corresponds to "value" in the slot size table 201.

The minimum data size among "data sizes" in the slot size table 201 may be referred to as a basic data size or a predetermined data size. The basic data size is multiplied by $2^n$ as "magnification" in the slot size table 201 to calculate a data size that may be set to each slot. In the example illustrated in FIG. 5, when the value n=0, the "magnification" is one and the "data size" is 4 KB. When the value n=1, the "magnification" is two and the "data size" is 8 KB. When the value n=2, the "magnification" is four and the "data size"

is 16 KB. When the value n=3, the "magnification" is eight and the "data size" is 32 KB.

The slot control unit 43 illustrated in FIG. 4 sets the data size of each slot by using information listed in the slot size table 201. The data size of each slot may be different between slots. Information related to the slot size table 201 may be stored in the storage devices 21 illustrated in FIG. 3.

Specifically, the slot control unit 43 functions as an exemplary determination unit configured to determine the size of deduplication processing between write data received from the host device 3 and data stored in the storage devices 21 in accordance with the size of the write data. The slot control unit 43 also functions as an exemplary determination unit configured to determine the processing size to be $2^n$ times larger than the predetermined data size as the LBA management unit.

Figure 6:
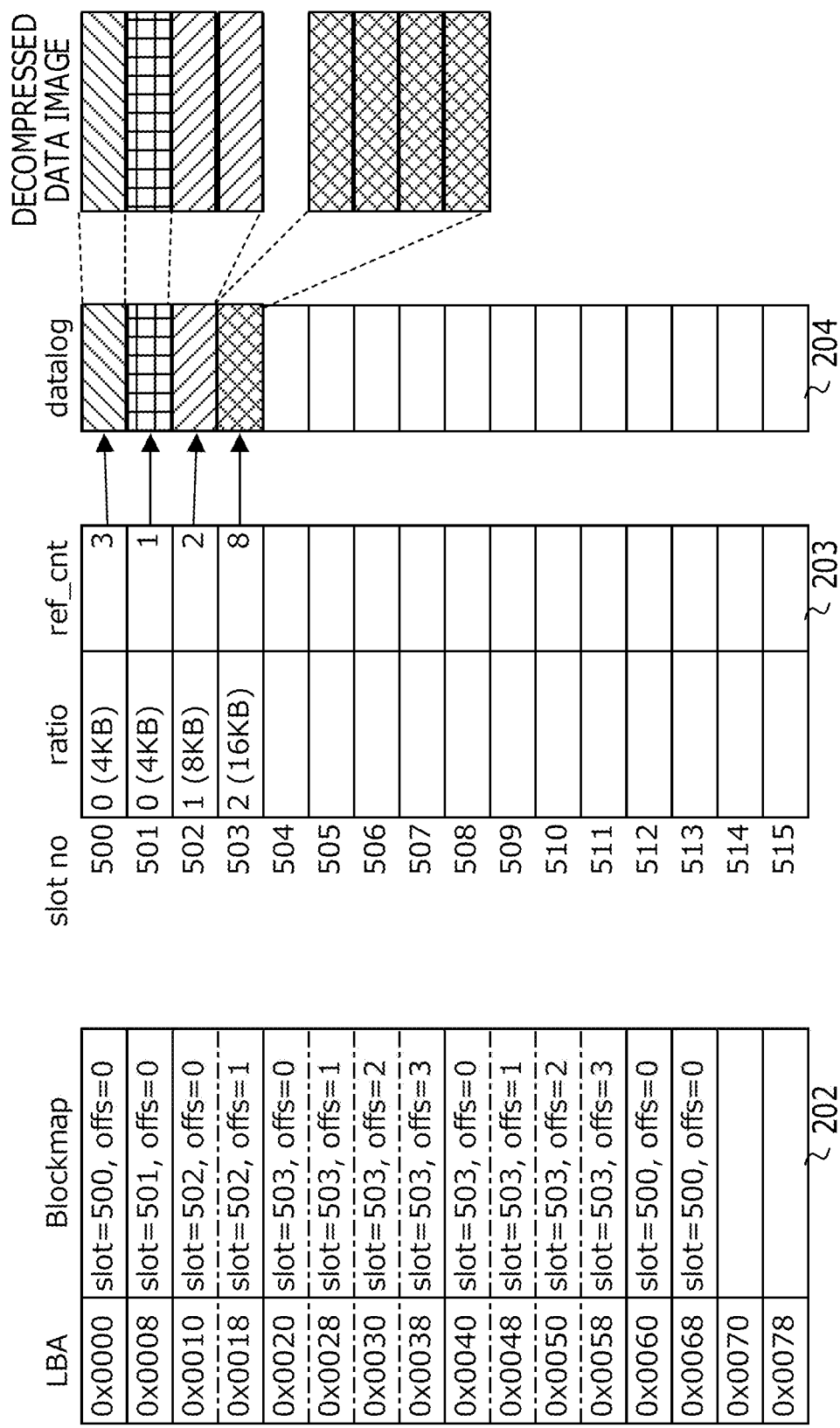
FIG. 6 is a diagram illustrating exemplary block mapping in the exemplary embodiment.

FIG. 6 is a diagram illustrating exemplary block mapping in the exemplary embodiment.

The CM 10 manages the volumes 51 illustrated in FIG. 4 by executing the block mapping exemplarily illustrated in FIG. 6.

The address conversion table 202 is a table for converting the address (also referred to as "logic address") of each volume 51 into a slot number. Information (also referred to as "mapping information") representing the address conversion table 202 may be stored in the storage devices 21.

In the address conversion table 202, each LBA of a predetermined data size (for example, 4 KB) irrespective of the slot size described with reference to FIG. 5 is associated with the slot number of a user volume. In the illustrated example, each LBA has a size of 512 bytes, the LBAs of 0x0000 to 0x007F are divided in 4 KB, and a slot number is allocated to each division (refer to "slot" of "blockmap" in the address conversion table 202). When the slot size exceeds 4 KB, an offset value indicating a pointed position in a slot is allocated to each LBA (refer to "offs" of "blockmap" in the address conversion table 202). For example, "slot=500, offs=0" is allocated to the range of LBA=0x0000 to 0x0007, and "slot=501, offs=0" is allocated to the range of LBA=0x0008 to 0x000F.

In the address conversion table 202 illustrated in FIG. 6, LBAs pointing to continuous offset values with an identical slot number are separated from each other by a dashed and single-dotted line. For example, slot=503 is allocated to the range of LBA=0x0020 to 0x003F. Similarly, slot=503 is allocated to the range of LBA=0x0040 to 0x005F.

Among LBAs to which the identical slot number "503" is allocated, offs=0 is allocated to the range of LBA=0x0020 to 0x0027, and offs=1 is allocated to the range of LBA=0x0028 to 0x002F. In addition, offs=2 is allocated to the range of LBA=0x0030 to 0x0027, and offs=3 is allocated to the range of LBA=0x0038 to 0x003F. Data of 4 KB is allocated to each slot in the order of offs=0, 1, 2, and 3.

The block map control unit 42 illustrated in FIG. 4 accesses to each volume 51 in the LBA unit (also referred to as the "block unit") of a predetermined data size.

In the slot management table 203, a slot size value (refer to "ratio" in FIG. 6) and a reference counter value (refer to "ref_cnt" in FIG. 6) are associated with each other for each slot number (refer to "slot no" in FIG. 6). The "reference counter value" is also referred to as a "reference value" or a "duplication data number". Information (also referred to as "slot management information") representing the slot management table 203 may be stored in the storage devices 21.

In the slot management table 203 illustrated in FIG. 6, the slot size value is set to be 0 (4 KB) for slot=500 and 501, 1 (8 KB) for slot=502, and 2 (16 KB) for slot=503.

The reference counter value indicates the number of blocks pointing to a corresponding slot number in the address conversion table 202. In FIG. 6, slot=500 is pointed from three blocks of LBA=0x0000 to 0x0007, 0x0060 to 0x0067, and 0x0068 to 0x006F, and thus the reference counter value thereof is set to be 3. In addition, slot=502 is pointed from two blocks of LBA=0x0010 to 0x00017 and 0x0018 to 0x001F, and thus the reference counter value thereof is set to be 2.

When a pointing destination is changed from the address conversion table 202 to the slot management table 203 through data update, the slot control unit 43 illustrated in FIG. 4 decrements by one, the reference counter value of a slot number pointed before the data update. Data of a slot, the reference counter value of which is changed to zero is recognized as a deletion target by the GC control unit 46 illustrated in FIG. 4.

An actual data table 204 records data divided in a predetermined data size (for example, 4 KB) and compressed (refer to "datalog" in FIG. 6). The slot size of slot=500 is 4 KB, and thus the data size of actual data (also referred to as "data log") and the data size of an image of decompressed data are both 4 KB (one block in FIG. 6). The slot size of slot=502 is 8 KB, and thus the data size of actual data is 4 KB (one block in FIG. 6), but the data size of an image of decompressed data is 8 KB (two blocks in FIG. 6). The slot size of slot=503 is 16 KB, and thus the data size of actual data is 4 KB (one block in FIG. 6), but the data size of an image of decompressed data is 16 KB (four blocks in FIG. 6).

The actual data control unit 44 illustrated in FIG. 4 reads compressed actual data from the volumes 51 through the DI control unit 50, and acquires decompressed data based on the read actual data.

Figure 7:
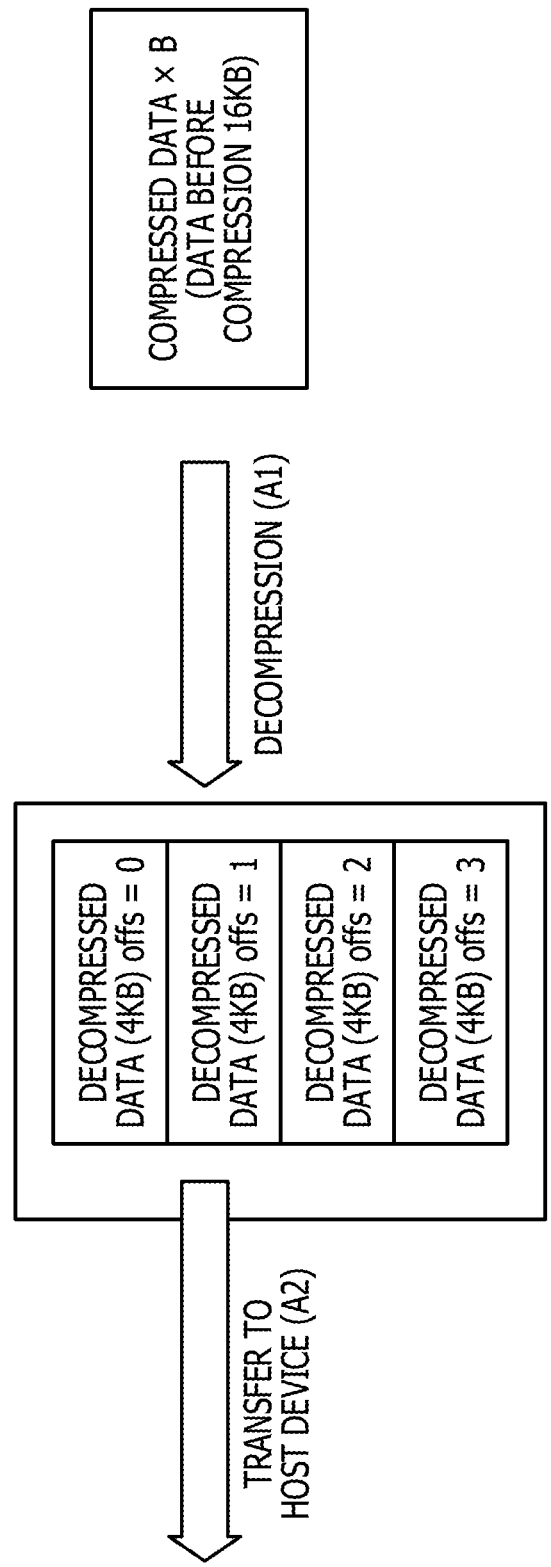
FIG. 7 is a diagram illustrating block decompression processing in the CM according to the exemplary embodiment.

FIG. 7 is a diagram illustrating block decompression processing at the CM 10 according to the exemplary embodiment.

In the example illustrated in FIG. 6, when a read request in 4 KB is issued to LBA=0x0050, for example, the following processing is executed.

The block map control unit 42 illustrated in FIG. 4 recognizes that LBA=0x0050 points to slot=503 and is associated with data. The slot control unit 43 illustrated in FIG. 4 refers to actual data indicated by slot=503. The actual data control unit 44 illustrated in FIG. 4 reads compressed data specified by the address of the referred actual data from the storage devices 21 through the DI control unit 50.

The actual data control unit 44 reads compressed data of x bytes through the DI control unit 50 and decompresses the read compressed data (refer to processing A1 in FIG. 7). The value x is a positive real number.

When the size of compressed data is 16 KB before compression, the actual data control unit 44 generates, from the compressed data, four pieces of decompressed data each containing data of 4 KB. The four pieces of decompressed data have offset values of offs=0 to 3, respectively.

The actual data control unit 44 transfers data of 4 KB from the leading offset of 8 KB among the generated four pieces of decompressed data to the host device 3 through the CA control unit 47 (refer to processing A2 in FIG. 7).

In this manner, data of 4 KB, which is smaller than a basic slot size, may be read from data written in the unit of 16 KB, which is larger than the slot size.

Figure 8:
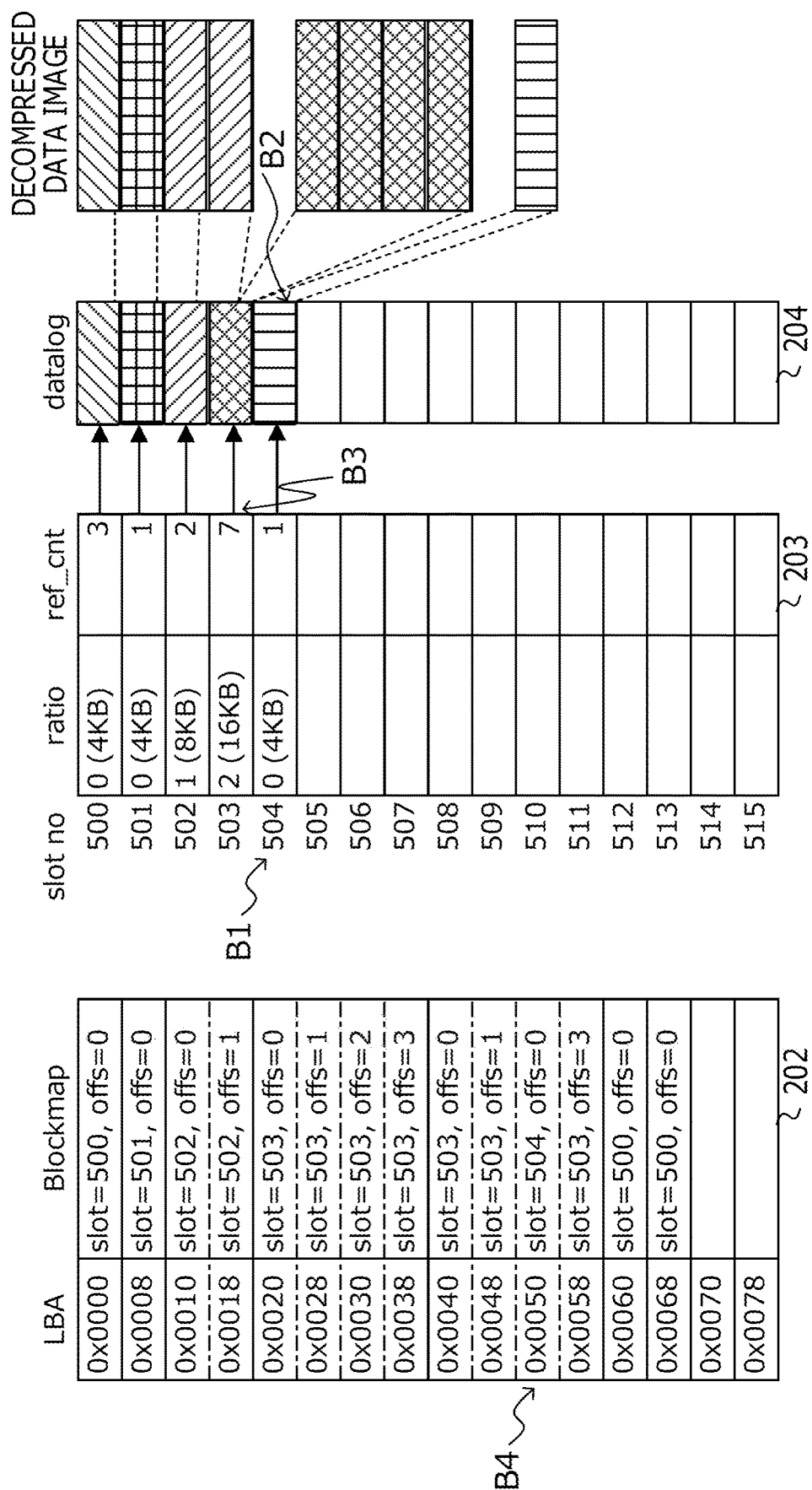
FIG. 8 is a diagram illustrating an exemplary block map at data rewriting in the CM according to the exemplary embodiment.

FIG. 8 is a diagram illustrating exemplary block mapping at data rewriting at the CM 10 according to the exemplary embodiment.

When having received a data write request through I/O from the host device 3, the CM 10 rewrites information related to the address conversion table 202, the slot management table 203, and the actual data table 204.

In the example illustrated in FIG. 8, write of non-duplicate new data of 4 KB is issued to LBA=0x0050 in the state illustrated in FIG. 6.

The block map control unit 42 recognizes, based on the address conversion table 202, that slot=503 is a slot pointed by LBA=0x0050 before update (the state illustrated in FIG. 6). The hash control unit 45 calculates the hash value of write data of 4 KB. In the example illustrated in FIG. 8, since the write data is non-duplicate new data, the hash value does not hit any other hash value (in other words, the hash value of the write data is not equal to the hash value of existing data having the slot size of 4 KB). The hash value may be a Secure Hash Algorithm-1 (SHA-1) value of 20 bytes.

The hash control unit 45 may determine whether data identical to the write data exists by comparing the hash of the write data with the hash of all existing data registered to the slot management table 203. Alternatively, the hash control unit 45 may determine whether data identical to the write data exists by comparing the hash of the write data with the hash of existing data having a slot size same as that of the write data. Since the hash comparison is performed only for a pair of write data and existing data having the same slot size, hash comparison processing may be performed fast to improve I/O performance and response of the storage system 100.

Since the write data is new data, the slot control unit 43 allocates slot=504 to the write data. Specifically, in the slot management table 203, ratio=0 (4 KB) and ref_cnt=1 are registered for slot=504, which is not associated with actual data in FIG. 6 (refer to Reference Sign B1).

The actual data control unit 44 compresses the write data and stores the compressed data in slot=504. Specifically, data corresponding to the write request from the host device 3 is registered to the actual data table 204 (refer to Reference Sign B2). Since the slot size of slot=504 is 4 KB, the data size of actual data and the data size of an image of decompressed data are both 4 KB (one block in FIG. 8).

The slot control unit 43 decrements the reference counter value of slot=504 by one. Specifically, in the slot management table 203, the reference counter value of slot=503, which is 8 in FIG. 6, is decremented to 7 in FIG. 8 (refer to Reference Sign B3).

The block map control unit 42 updates the pointing destination of LBA=0x0050 to 0x0057 from "slot=503, offs=2" to "slot=504, offs=0" in the address conversion table 202 (refer to Reference Sign B4).

Specifically, the block map control unit 42, the slot control unit 43, the actual data control unit 44, and the hash control unit 45 each function as an exemplary processing unit configured to process write data in a determined processing size, and perform the deduplication processing between the write data and written data having a processing size same as that of the write data processed in the determined processing size. The block map control unit 42, the slot control unit 43, the actual data control unit 44, and the hash control unit 45 also each function as an exemplary processing unit configured to perform the deduplication processing and write data processing by using mapping information and slot management information stored in the storage devices 21.

When a read request of 8 KB is issued to LBA=0x0050 (specifically, a read request to LBA=0x0050 to 0x005F) in the state illustrated in FIG. 8, for example, the following processing is executed.

The block map control unit 42 refers to slot=504 pointed by LBA=0x0050 and slot=503 pointed by LBA=0x0058. The slot control unit 43 recognizes that data corresponding to the referred slot=504 and 503 exists.

The actual data control unit 44 reads compressed data of slot=504 and decompresses the read data to generate decompressed data of 4 KB.

The actual data control unit 44 also reads compressed data of slot=503 and decompresses the read data to generate decompressed data of 16 KB. Since LBA=0x0058 points to offs=3 in slot=503, the actual data control unit 44 reads data of 4 KB starting at the position of 12 KB in the decompressed data of 16 KB.

The I/O control unit 41 transfers decompressed data of 4 KB in slot=504 and data of 4 KB in slot=503 to the host device 3 through the CA control unit 47.

FIG. 9 is a diagram illustrating an exemplary slot division table 205 in the exemplary embodiment.

Upon I/O from the host device 3, the slot control unit 43 rounds up the I/O size to an integral multiple of the basic slot size (for example, 4 KB). For example, when the I/O size is 19 KB, the data size is rounded up to 20 KB. The slot control unit 43 divides the data size after the roundup in the largest slot size (for example, the largest size among sizes determined by $4 \times 2^n$ KB) from the start of the I/O data. For example, data of 20 KB is divided into data of 16 KB+4 KB.

The slot control unit 43 may divide I/O data into data of 32 KB×4 when I/O of 128 KB occurs while the maximum value of the slot size is 32 KB.

The slot division table 205 illustrated in FIG. 9 indicates that the "I/O size" of I/O data from the host device 3 is rounded up to a "rounded-up size" that may be expressed in $4 \times a$ KB, and data of the "rounded-up size" is divided into data of a "division size" that may be expressed in $4 \times 2^n$. The "division size" corresponds to the slot size of the corresponding I/O data. The value a is a positive integer. In the example illustrated in FIG. 9, the maximum value of the slot size is 32 KB.

In the example illustrated in FIG. 9, when the "I/O size" is 0.5 KB to 4 KB, the "rounded-up size" is 4 KB and the "division size" is 4 KB. Specifically, the slot control unit 43 illustrated in FIG. 4 allocates the slot size of 4 KB in response to I/O of 0.5 KB to 4 KB.

When the "I/O size" is 7.5 KB to 12 KB, the "rounded-up size" is 12 KB, and the "division size" is 8 KB+4 KB. Specifically, the slot control unit 43 illustrated in FIG. 4 allocates the two slot sizes of 8 KB+4 KB in response to I/O of 7.5 KB to 12 KB.

When the "I/O size" is 24.5 KB to 28 KB, the "rounded-up size" is 28 KB, and the "division size" is 16 KB+8 KB+4 KB. Specifically, the slot control unit 43 illustrated in FIG. 4 allocates the three slot sizes of 16 KB+8 KB+4 KB in response to I/O of 24.5 KB to 28 KB.

In other words, the slot control unit 43 selects a slot size equal to or larger than the size of write data from the host device 3, or a combination of such slot sizes.

The minimum I/O size for Small Computer System Interface (SCSI) is 0.5 KB, and thus ranges listed in "I/O size" in FIG. 9 are set at intervals of 0.5 KB.

Figure 10:
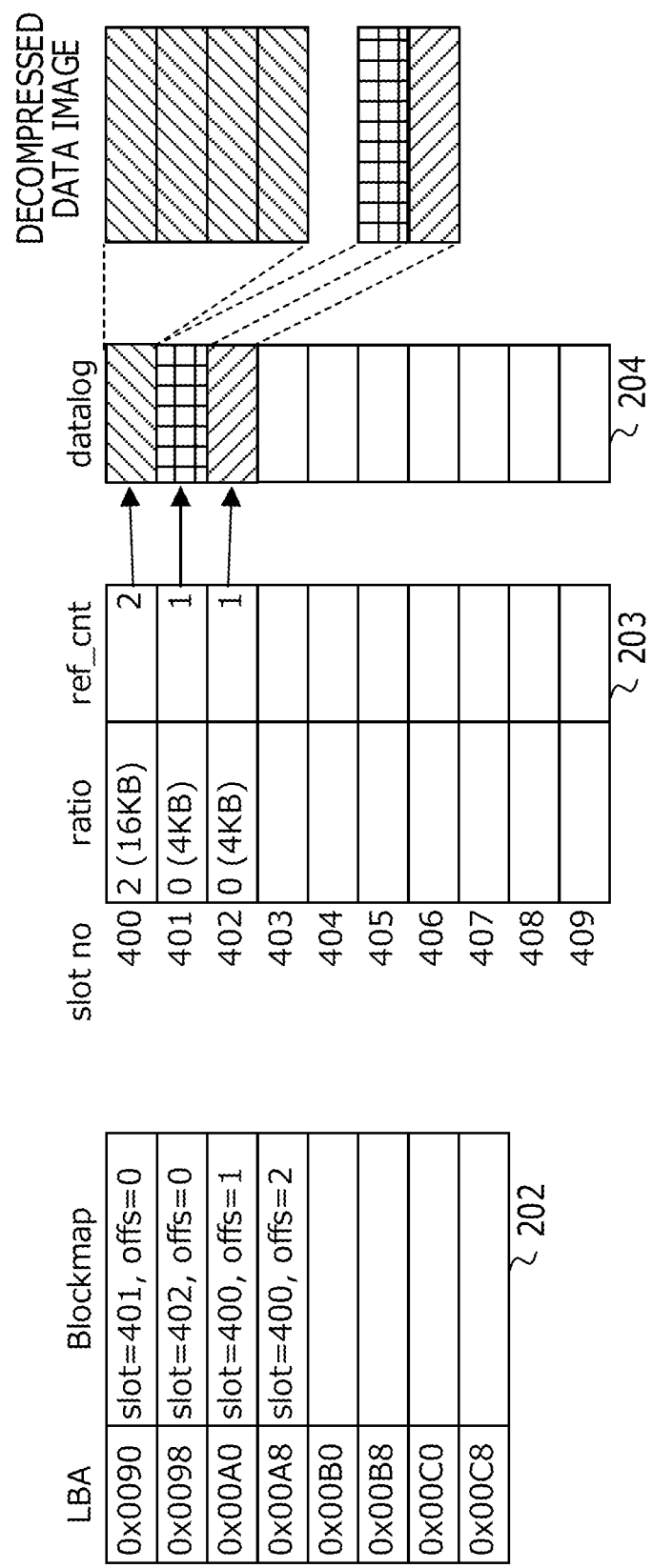
FIG. 10 is a diagram for description of the relation between a write data size and a slot size in the CM according to the exemplary embodiment.

FIG. 10 is a diagram for description of the relation between a write data size and a slot size at the CM 10 according to the exemplary embodiment.

In the example illustrated in FIG. 10, data of 16 KB is written to LBA=0x0090 to 0x00AF, and slot=400 is allocated in 16 KB. Data of 4 KB is written to LBA=0x0090. Since slot=401 pointed by LBA=0x0090 is not pointed by any other LBA, no hash hitting occurs, and slot=401 is newly allocated in 4 KB. In addition, data of 4 KB is written to LBA=0x0098. Since slot=402 pointed by LBA=0x0098 is not pointed by any other LBA, no hash hitting occurs, and slot=402 is newly allocated in 4 KB.

A region of 16 KB+4 KB+4 KB=24 KB is allocated in the slot management table 203 illustrated in FIG. 10. The four regions of LBA=0x0090 to 00x00AF are used in the address conversion table 202, and thus the slots of 24 KB are allocated for write data of 16 KB. In other words, deduplication is not efficiently performed in the example illustrated in FIG. 10.

When slot=400 is also pointed by LBA=0x00B0 to 0x00CF, an actual data region of 24 KB is allocated for write data of 32 KB, and thus deduplication is efficiently performed.

Thus, the CM 10 in the exemplary embodiment may perform slot size optimization processing when I/O from the host device 3 has occurred.

In some cases, the slot management table 203 is read out of synchronization with the occurrence of I/O and then the slot size optimization processing is performed. In such a case, it is impossible to perform opposite reference to a block map (in other words, "the address conversion table 202") from a slot, and thus the block map may not be updated when the slot is moved. It is possible to read the entire region of the address conversion table 202 and perform the slot size optimization processing by referring to a slot number pointed by each LBA, but it potentially takes a long time to read the entire region of the address conversion table 202.

To avoid this, when data write processing is executed, whether to execute the slot size optimization processing may be determined by comparing, with the reference counter value, the slot magnification of a slot for which the reference counter value is subtracted. The slot size optimization processing may be executed when the slot magnification is larger than the reference counter value.

In the example illustrated in FIG. 10, ratio=2 (16 KB) is set to slot=400 in the slot management table 203, and the slot magnification is "four times" larger than the basic slot size (4 KB). For slot=400, the slot magnification of "4" is larger than the reference counter value. Thus, the slot size optimization processing may be executed by newly allocating slot=403 with the slot magnification of 8 KB and setting the reference counter value of slot=400 to be zero so that slot=400 is a deletion target.

Figure 11:
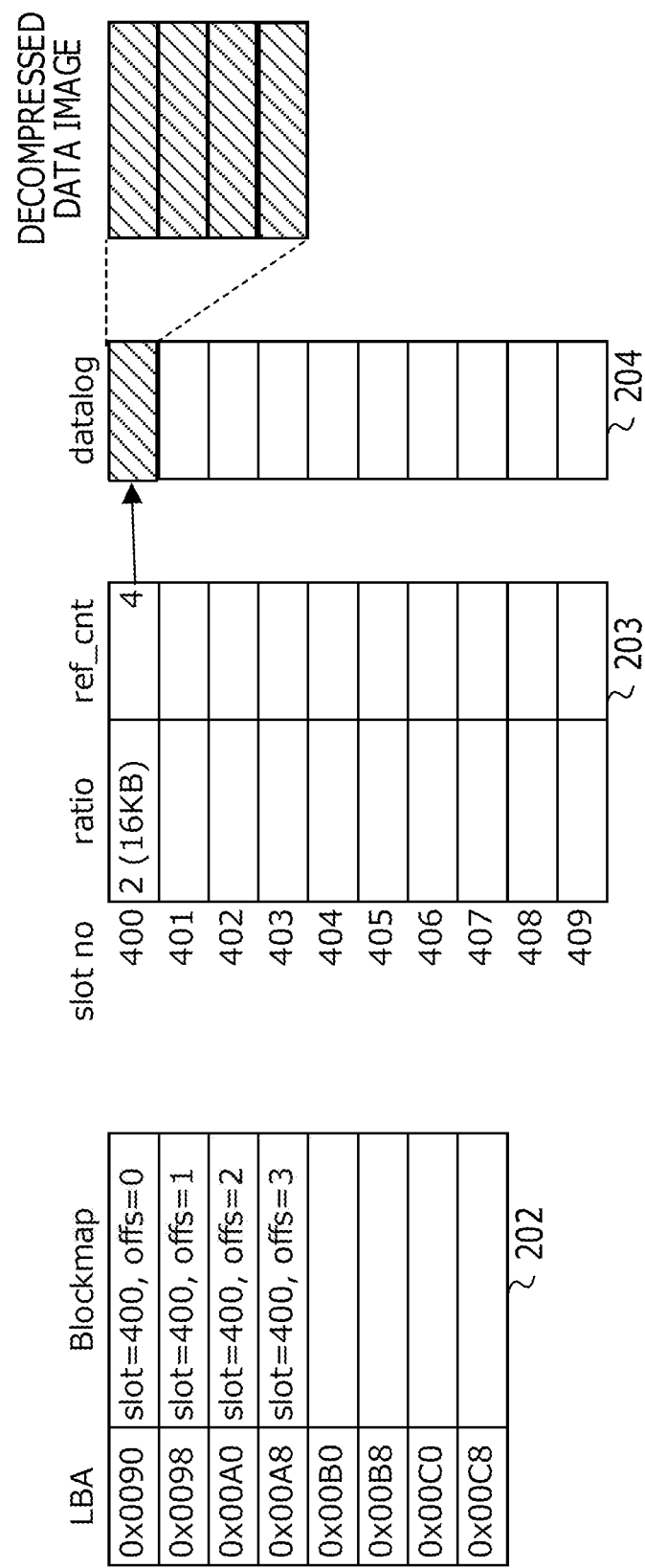
FIG. 11 is a diagram for description of slot size optimization processing in the CM according to the exemplary embodiment.
Figure 12:
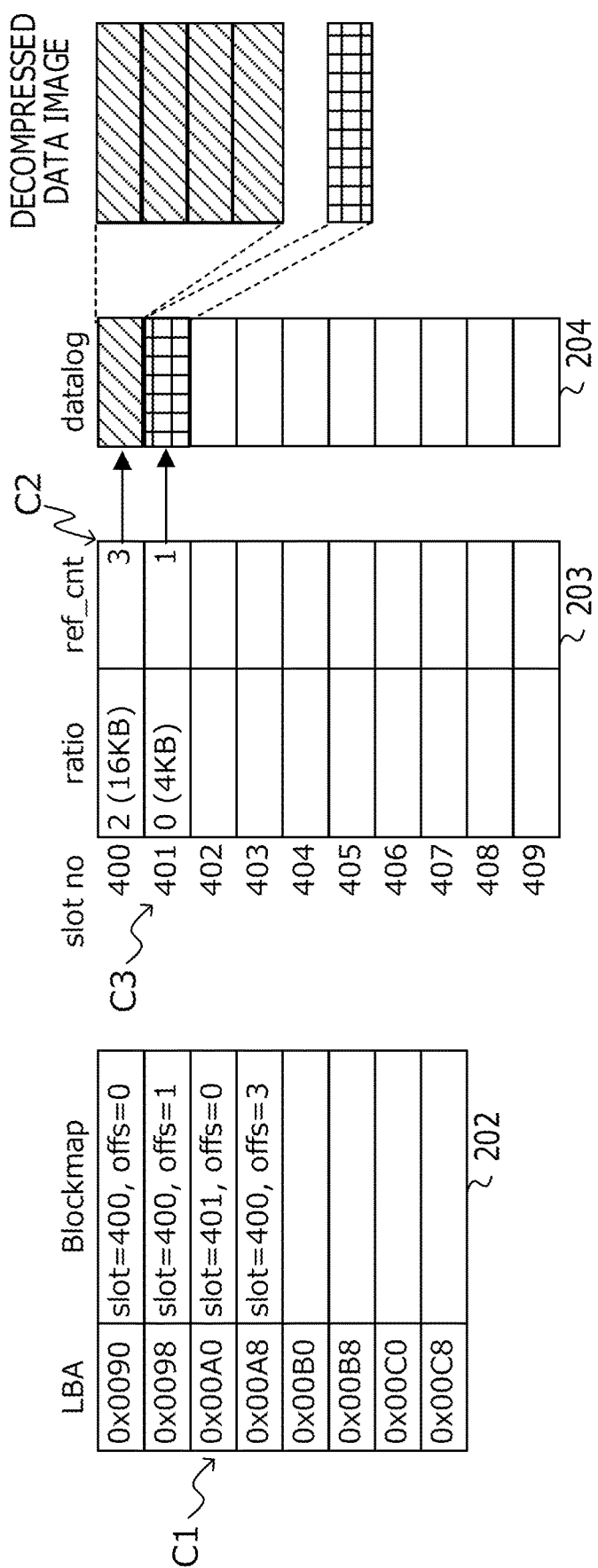
FIG. 12 is a diagram for description of the slot size optimization processing in the CM according to the exemplary embodiment.
Figure 13:
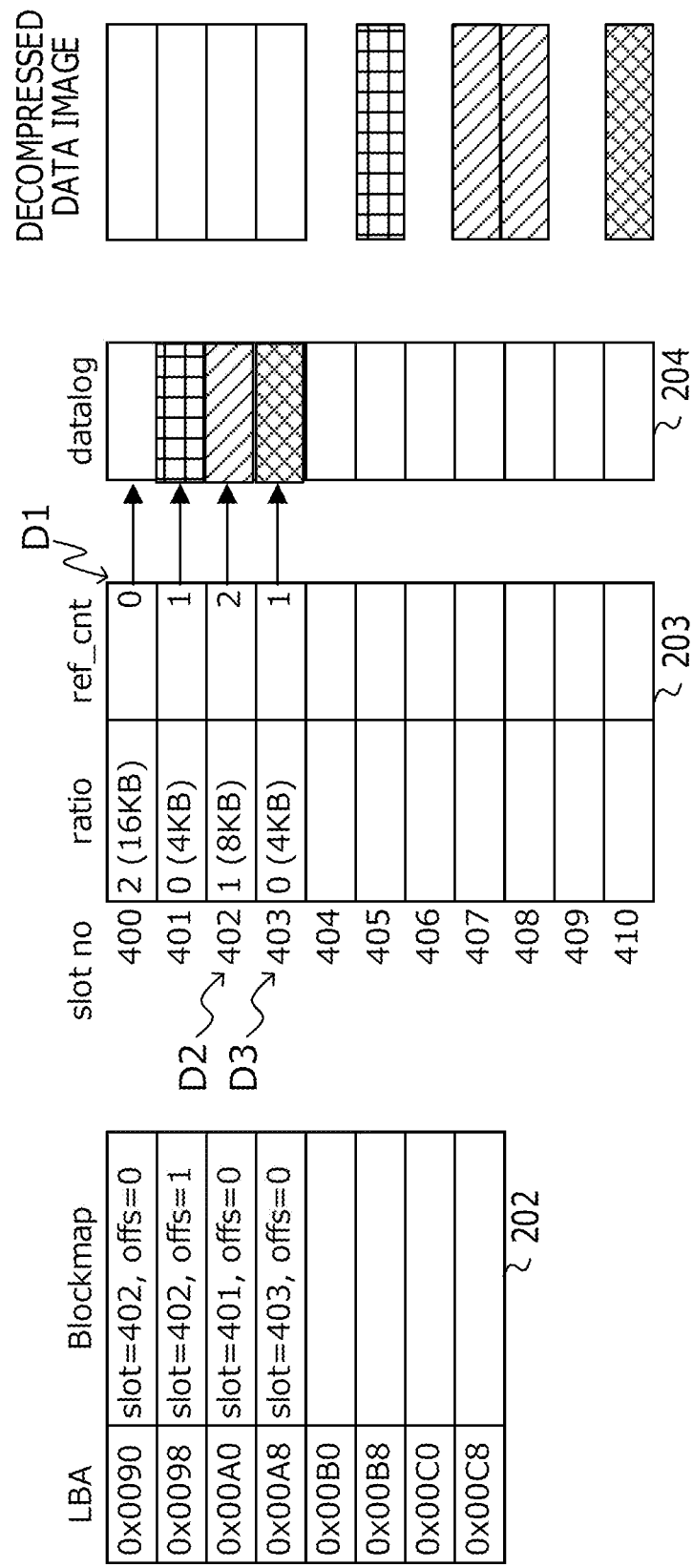
FIG. 13 is a diagram for description of the slot size optimization processing in the CM according to the exemplary embodiment.

FIGS. 11 to 13 are diagrams for description of the slot size optimization processing at the CM 10 according to the exemplary embodiment. FIGS. 11 to 13 illustrate the process of block mapping change due to data rewrite processing and the slot size optimization processing at the volumes 51.

An initial state is assumed to be such that data of 16 KB is written to the range of LBA=0x0090 to 0x00AF as illustrated in FIG. 11. In the address conversion table 202, the four blocks of LBA=0x0090 to 0x00AF refer to offs=0 to 3, respectively, of slot=400. For slot=400 in the slot management table 203, the slot size value is 2 (16 KB), and the reference counter value is 4.

In the state illustrated in FIG. 12, upon the occurrence of write I/O, the block map of LBA=0x00A0 to 0x00A7 has been rewritten from "slot=400, offs=2" to "slot=401, offs=0" in the address conversion table 202 (refer to Reference Sign C1). Accordingly, in the slot management table 203, the reference counter value of slot=400 is decremented from 4 to 3 (refer to Reference Sign C2). In addition, the slot size value of "0" (4 KB) and the reference counter value of "1" are registered to slot=401 (refer to Reference Sign C3).

In the example illustrated in FIG. 12, ratio=2 (16 KB) is set to slot=400 in the slot management table 203, and the slot magnification is "four times" larger than the basic slot size (4 KB). Upon the decrement of the reference counter value of slot=400, which is indicated by Reference Sign C2, the slot magnification of "4" becomes larger than the reference counter value of "3".

Thus, in the address conversion table 202, a block map in an I/O range before I/O data writing is extended by the size of a slot pointed by the block map and referred to.

In the example illustrated in FIG. 12, before I/O data writing, the region of LBA=0x00A0 to which the writing is performed points to "slot=400, offs=2", and the magnification of slot=400 is four. Thus, the block map control unit 42 refers to an LBA obtained by extending an LBA region to which write I/O is issued to be four times larger. When offs=2 pointed by the LBA region to which write I/O is issued is extended to be four times larger, offs=0 to 3 is obtained, and the extend block map has LBA=0x0090 to 0x00AF. The block map control unit 42 reads the extend block map, counts the number of block maps pointing to slot=400 before the writing, and compares the counted number of block maps with the reference counter value of slot=400. In the example illustrated in FIG. 12, the three block maps of LBA=0x0090, 0x0098, and 0x00A8 point to slot=400, and the number of block maps is equal to the reference counter value of "3".

Then, slot size reallocation processing is executed as illustrated in FIG. 13. In FIG. 13, the slot control unit 43 allocates continuous LBAs=0x0090 and 0x0098 collectively to a slot of 8 KB, and allocates LBA=0x00A8 to a slot of 4 KB. When hash values are calculated to be identical to each other, slot allocation may be performed for I/O data as duplication data, similarly to the slot allocation at the occurrence of write I/O from the host device 3. FIG. 13 illustrates an example in which no hash hitting occurs and slot allocation is performed for the I/O data as non-duplicate data.

In the example illustrated in FIG. 13, the reference counter value of slot=400 in the slot management table 203 is set to be zero so that the slot becomes a deletion target (refer to Reference Sign D1). The slot size value of "1" (8 KB) and the reference counter value of "2" are set to slot=402 (refer to Reference Sign D2), and the slot size value of "0" (4 KB) and the reference counter value of "1" are set to slot=403 (refer to Reference Sign D3).

In other words, the block map control unit 42 functions as an exemplary control unit configured to change, when a value specifying a processing size in slot management information is larger than a reference value, a slot number referred to by the corresponding LBA. The slot control unit 43 functions as an exemplary control unit configured to perform control to determine the processing size for the changed slot number.

Figure 14:
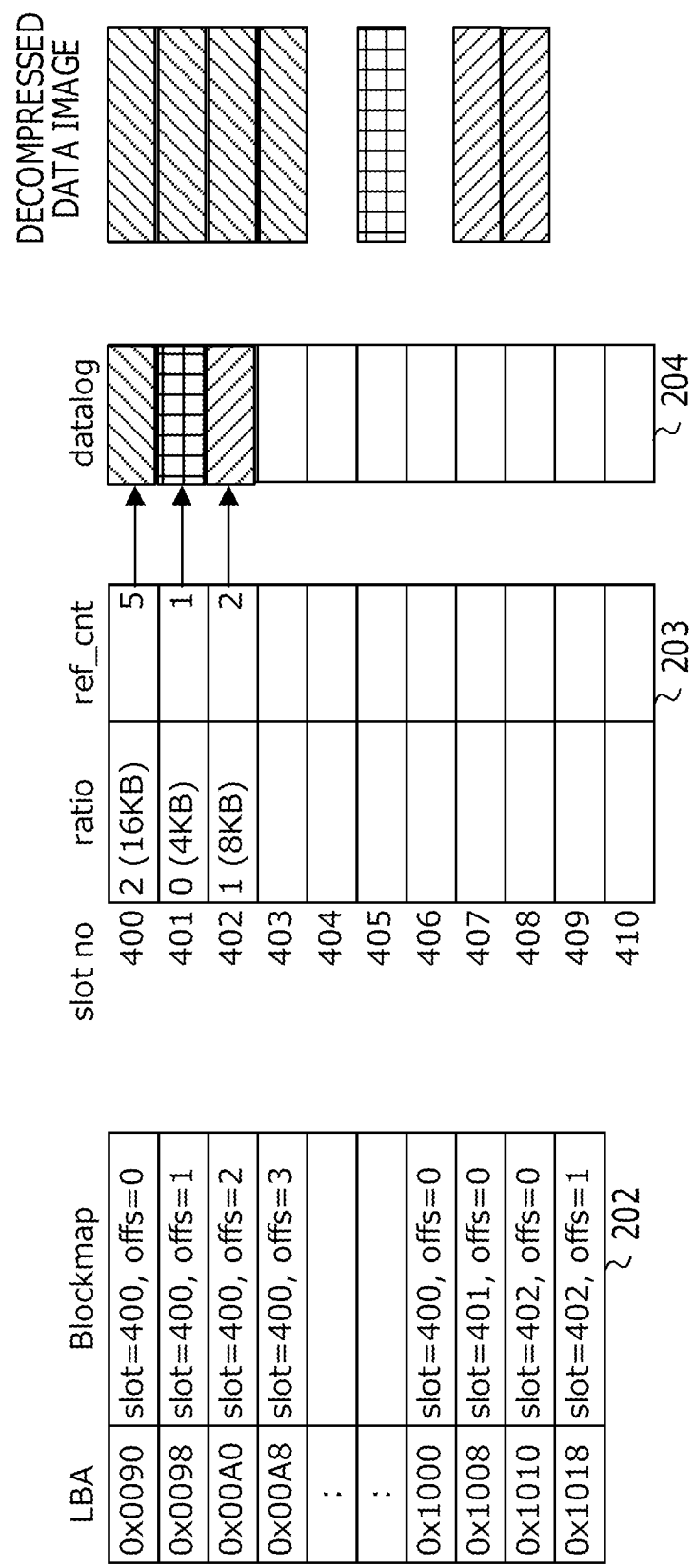
FIG. 14 is a diagram for description of a case in which the slot size optimization processing in the CM according to the exemplary embodiment is not performed.
Figure 15:
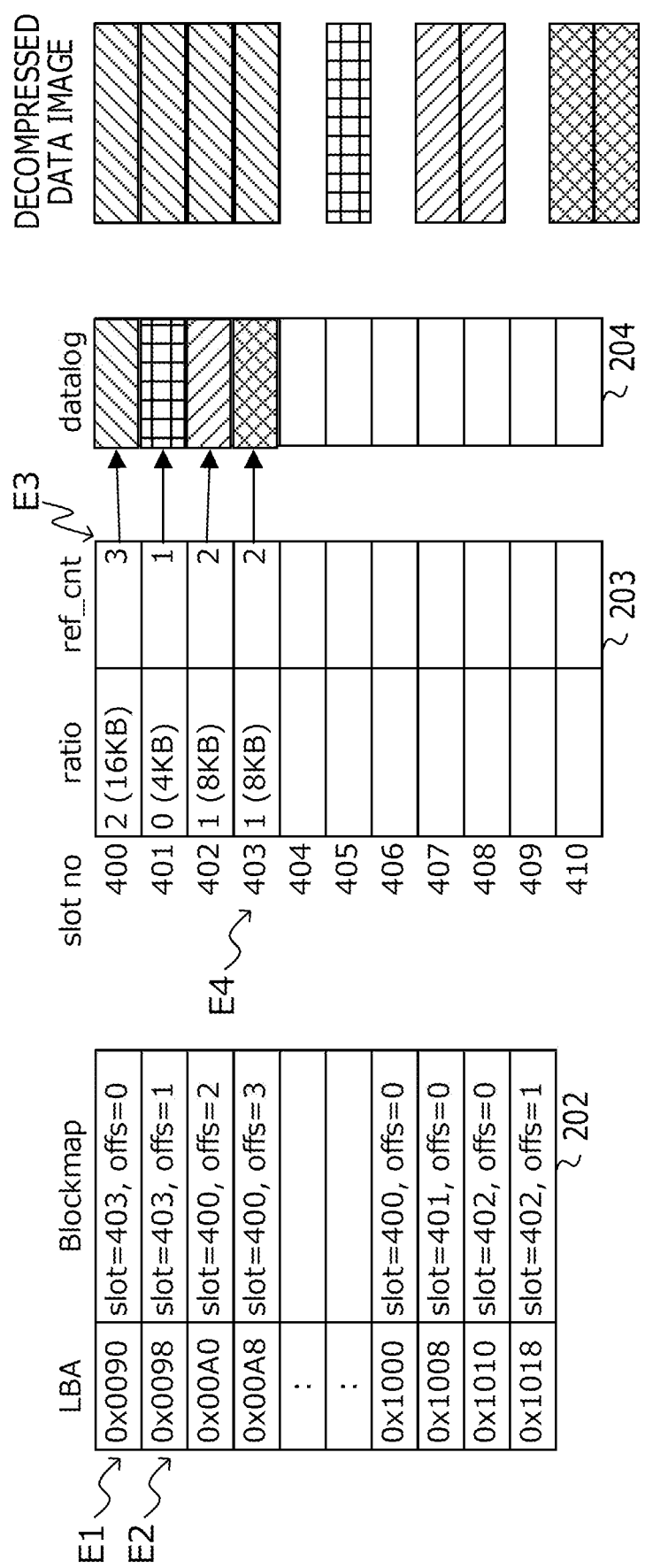
FIG. 15 is a diagram for description of a case in which the slot size optimization processing in the CM according to the exemplary embodiment is not performed.

FIGS. 14 and 15 are diagrams for description of a case in which the slot size optimization processing is not performed at the CM 10 according to the exemplary embodiment. FIGS. 14 and 15 illustrate the process of block mapping change due to data rewrite processing at the volumes 51.

In the example illustrated in FIG. 14, slot=400 is pointed in the range of LBA=0x0090 to 0x00AF and 0x1000 to 0x1007.

For example, as illustrated in FIG. 15, LBA=0x0090 to 0x0097 is rewritten to "slot=403, offs=0" (refer to Reference Sign E1), and LBA=0x0098 to 0x009F is rewritten to "slot=403, offs=1" (refer to Reference Sign E2), and accordingly, data of a total of 8 KB is updated. The rewriting of the pointing destinations of slots in the address conversion table 202 updates the reference counter value of slot=400 in the slot management table 203 from 5 to 3 (refer to Reference Sign E3). The slot size value of "1" (8 KB) and the reference counter value of "2" are registered to slot=403 in the slot management table 203 (refer to Reference Sign E4).

Extending a region updated in the address conversion table 202 by the slot magnification of slot=400, which is four times, obtains LBA=0x0090 to 0x00AF. In the range of LBA=0x0090 to 0x00AF, the two regions of LBA=0x00A0 to 0x00A7 and LBA=0x00A8 to 0x00AF point to slot=400. The counted number of LBA regions pointing to slot=400 is two, and the reference counter value of slot=400 is three. Thus, the number of LBA regions pointing to slot=400 is not equal to the reference counter value. When the number of LBA regions pointing to slot=400 is not equal to the reference counter value, slot=400 is also pointed by an LBA other than any block map in a range obtained by extending a write range by the slot magnification. In the example illustrated in FIG. 15, LBA=0x1000 points to slot=400.

To reallocate data of slot=400 in the slot management table 203, the pointing destination of LBA=0x0100 pointing to slot=400 in the address conversion table 202 is changed. However, the entire range of block maps have to be read to specify that LBA=0x0100 is an LBA pointing to slot=400. Accordingly, the slot size optimization processing potentially takes a long time.

To efficiently perform the slot size optimization processing, the slot reallocation processing does not have to be executed when the pointing destinations of some of multiple blocks pointing to an identical slot and but having discontinuous LBAs are rewritten.

Specifically, the block map control unit 42 functions as an exemplary control unit configured to change a slot number when an LBA having a slot number same as that of the LBA of a data writing region is continuous with the LBA of the data writing region. The slot control unit 43 functions as an exemplary control unit configured to determine the processing size for a changed slot number when an LBA having a slot number same as that of the LBA of a data writing region is continuous with the LBA of the data writing region.

[B-2] Exemplary Operation

Figure 16:
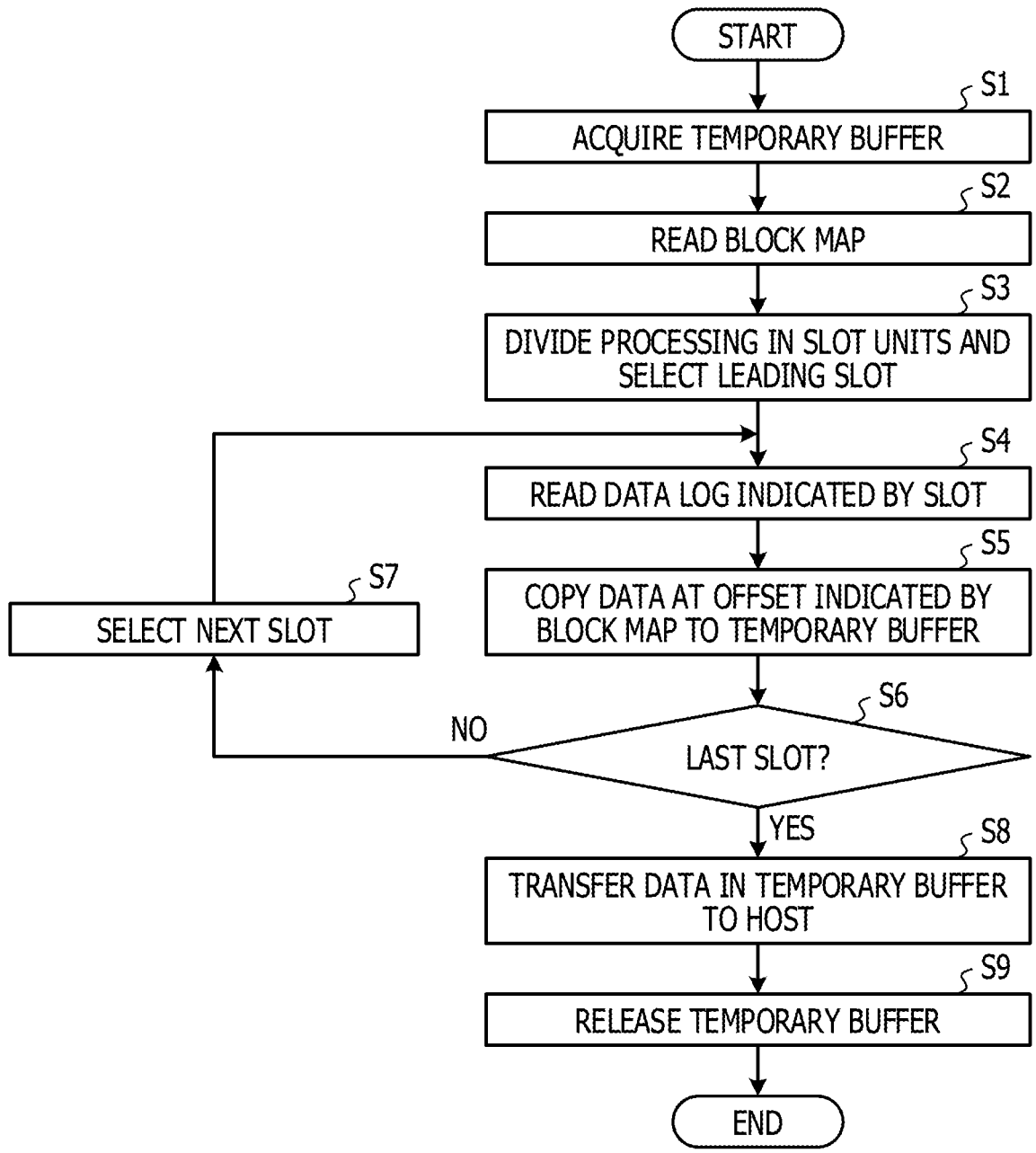
FIG. 16 is a flowchart for description of control processing in response to a data read command in the CM according to the exemplary embodiment.

Control processing in response to a data read command at the CM 10 according to the exemplary embodiment described above will be described below with reference to a flowchart (steps S1 to S9) illustrated in FIG. 16.

When having received read I/O from the host device 3 through the CA control unit 47, the I/O control unit 41 acquires a temporary buffer for storing read data through the cache control unit 48 (step S1).

The block map control unit 42 reads any block map in an I/O range in the address conversion table 202 (step S2).

The slot control unit 43 divides processing in the unit of a slot pointed by an LBA corresponding to the read I/O, and selects the leading slot among divided slots (step S3).

The actual data control unit 44 reads, through the DI control unit 50, actual data indicated by the selected slot (step S4).

The I/O control unit 41 copies, through the cache control unit 48, data at an offset indicated by a data block to the temporary buffer (step S5).

The slot control unit 43 determines whether processing is completed for the last slot among the slots in the I/O range (in other words, the "divided slots") (step S6).

When the processing of the last slot is not completed (refer to No at step S6), the slot control unit 43 selects the next slot (step S7). Then, the process returns to step S4.

When the processing of the last slot is completed (refer to Yes at step S6), the process proceeds to step S8. Then, the I/O control unit 41 reads data stored in the temporary buffer through the cache control unit 48, and transfers the read data to the host device 3 through the CA control unit 47 (step S8).

The I/O control unit 41 releases the temporary buffer through the cache control unit 48 (step S9). Then, the control processing in response to the data read command ends.

Control processing in response to a data write command at the CM 10 according to the exemplary embodiment will be described below with reference to a flowchart (steps S11 to S25) illustrated in FIG. 17.

When having received write I/O from the host device 3 through the CA control unit 47, the I/O control unit 41 acquires a temporary buffer for storing write data through the cache control unit 48 (step S11).

The I/O control unit 41 stores the write data in the temporary buffer through the cache control unit 48 (step S12).

The slot control unit 43 determines the slot size of the write data and selects the leading slot (step S13).

The hash control unit 45 calculates the hash of the write data based on the determined slot size, and calculates the hash value of data having a slot size same as the determined slot size and registered to the slot management table 203, by using actual data in the actual data table 204 (step S14). The hash value of data registered to the slot management table 203 may be registered in advance to a hash management table (not illustrated) managed by the hash control unit 45, and used for comparison between write data and existing data. For example, a hash value may be calculated when data is registered to the slot management table 203, and then registered to the hash management table in advance.

The hash control unit 45 determines whether hash hitting occurs by comparing the hash value of the write data with the hash value of data having the same slot size and registered to the slot management table 203 (step S15).

When hash hitting has occurred (refer to Yes at step S15), the slot control unit 43 adds the number of block maps to the reference counter of the slot (step S16). Then, the process proceeds to step S19.

When no hash hitting has occurred (refer to No at step S15), the slot control unit 43 allocates a new slot in the slot management table 203 (step S17).

The actual data control unit 44 reads the write data from the temporary buffer through the cache control unit 48, and writes the read data as actual data to the storage devices 21 through the DI control unit 50 (step S18).

The slot control unit 43 determines whether processing is completed for the last slot among the slots in the I/O range (step S19).

When the processing of the last slot is not completed (refer to No at step S19), the slot control unit 43 selects the next slot (step S20). Then, the process returns to step S14.

When the processing of the last slot is completed (refer to Yes at step S19), the slot control unit 43 subtracts the reference counter of the slot indicated by the block maps before update in the slot management table 203 (step S21).

The slot control unit 43 performs the slot size optimization processing (step S22). The slot size optimization processing will be described later in detail with reference to FIG. 18.

The block map control unit 42 updates block maps in the address conversion table 202 (step S23).

The I/O control unit 41 releases the temporary buffer through the cache control unit 48 (step S24).

The I/O control unit 41 notifies completion of the processing to the host device 3 through the CA control unit 47 (step S25). Then, the control processing in response to the data write command ends.

Figure 17:
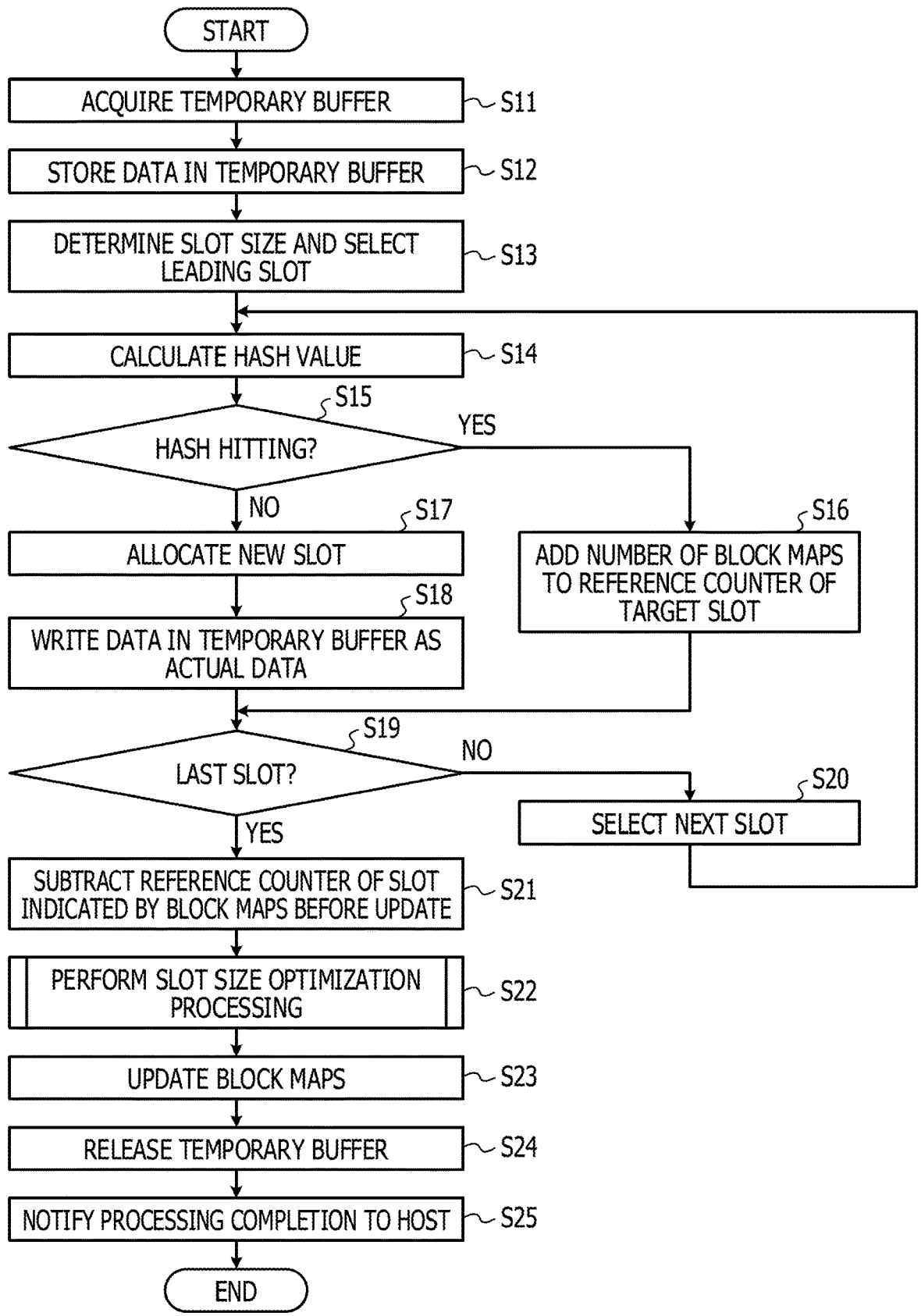
FIG. 17 is a flowchart for description of control processing in response to a data write command in the CM according to the exemplary embodiment.

In the example illustrated in FIG. 17, the slot size optimization processing (refer to step S22) is performed after the processing (refer to steps S14 to S20) is completed for each slot, but the present disclosure is not limited thereto. The slot size optimization processing may be repeatedly performed in the processing (for example, between the processing at step S16 or S18 and the processing at step S19) for each slot. Alternatively, the slot size optimization processing may be performed out of synchronization with the control processing in response to the data write command at steps S11 to S25 after completion of the control processing in response to the data write command. This configuration reduce a time taken until the notification of processing completion to the host device 3 at step S25 since issue of the write I/O from the host device 3, thereby achieving improvement of response.

The CM 10 may perform the slot size determination processing at step S13 and the slot size optimization processing at step S22 in real time at each reception of write data from the host device 3. Accordingly, the slot size determination processing and the slot size optimization processing may be completed fast to further improve the I/O performance and response of the storage system 100.

The deduplication processing may be performed by comparing the hash value of write data with the hash values of all pieces of existing data registered to the slot management table 203. Alternatively, the deduplication processing may be performed by comparing the hash value of write data with the hash value of existing data having a slot size same as that of the write data. Since the hash comparison is performed only for any pair of write data and existing data having the same slot size, the hash comparison processing may be performed fast to improve the I/O performance and response of the storage system 100.

Figure 18:
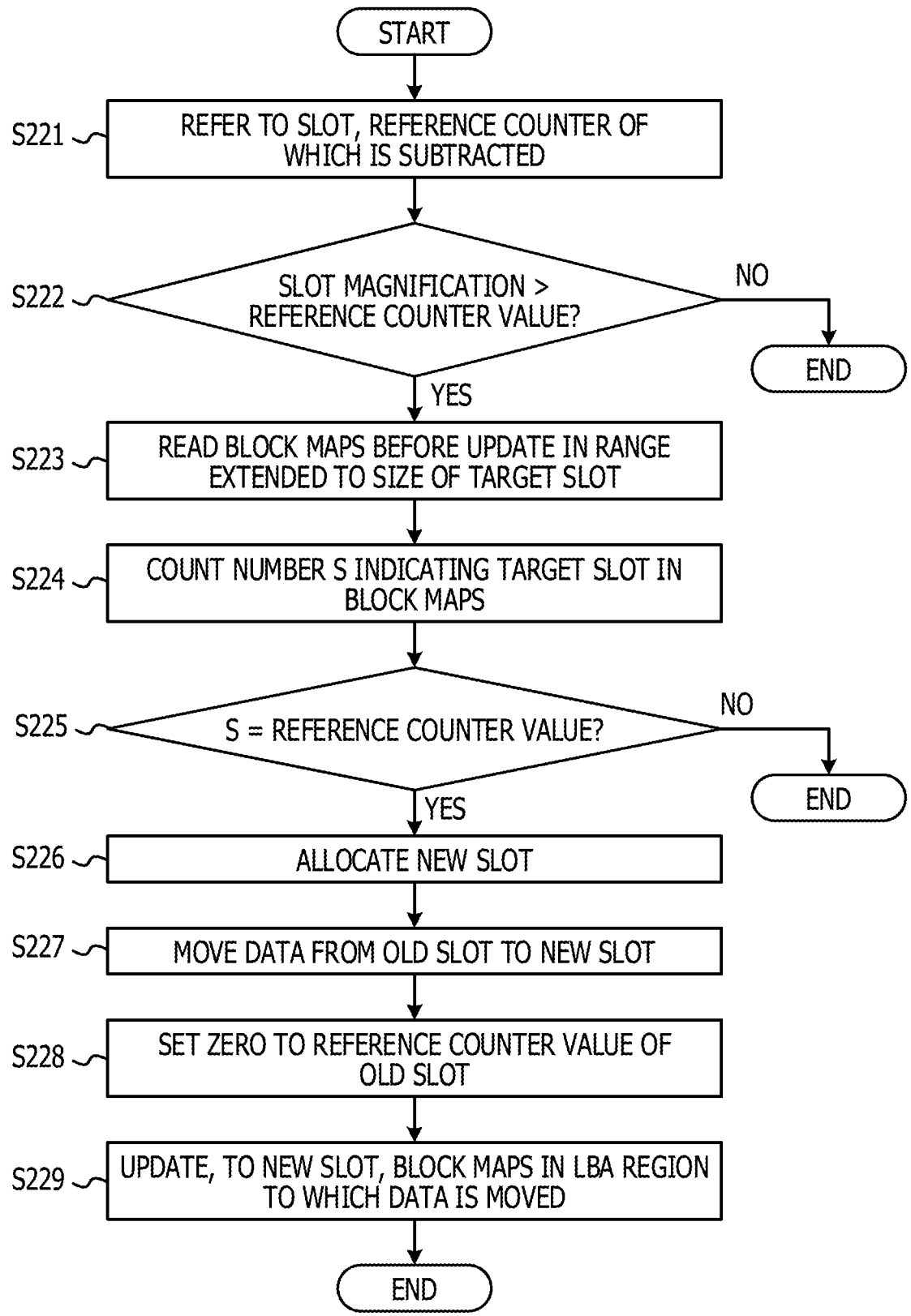
FIG. 18 is a flowchart for description of the slot size optimization processing in the CM according to the exemplary embodiment.

The slot size optimization processing at the CM 10 according to the exemplary embodiment will be described below with reference to a flowchart (steps S221 to S229) illustrated in FIG. 18.

The slot control unit 43 refers to a slot, the reference counter of which is subtracted in the slot management table 203 (step S221).

The slot control unit 43 determines whether the slot magnification is larger than the reference counter value (step S222).

When the slot magnification is not larger than the reference counter value (refer to No at step S222), the slot size optimization processing ends.

When the slot magnification is larger than the reference counter value (refer to Yes at step S222), the block map control unit 42 reads block maps before update in a range extended to the size of an I/O target slot (step S223).

The block map control unit 42 counts the number S (S is an integer equal to or larger than zero) of regions indicating the I/O target slot in block maps (step S224).

The block map control unit 42 determines whether the number S of regions indicating the I/O target slot is equal to the reference counter value of the I/O target slot (step S225).

When the number S of regions indicating the I/O target slot is not equal to the reference counter value of the I/O target slot (refer to No at step S225), the slot size optimization processing ends.

When the number S of regions indicating the I/O target slot is equal to the reference counter value of the I/O target slot (refer to Yes at step S225), the process proceeds to step S226. Then, the slot control unit 43 allocates a new slot in the slot management table 203 (step S226).

The actual data control unit 44 moves data from the old slot to the new slot (step S227).

The slot control unit 43 sets zero to the reference counter value of the old slot (step S228).

The block map control unit 42 updates, to the new slot, block maps in an LBA region to which the data is moved (step S229). Then, the slot optimization processing ends.

[B-3] Effects

The CM 10 according to the above-described exemplary embodiment may provide effects as described below, for example.

The slot control unit 43 determines, in accordance with the size of write data received from the host device 3, a slot size performing the deduplication processing between the write data and data stored in the storage devices 21. The block map control unit 42, the slot control unit 43, the actual data control unit 44, and the hash control unit 45 perform the deduplication processing in the determined slot size and process the write data. Accordingly, the I/O performance of the deduplication processing may be improved. Specifically, in an environment with mixture of I/O in different sizes, the performance of the storage system 100 may be improved by changing the unit of processing for each I/O. Since the slot size is not fixed to a large value, a rate of deduplication of write data may be improved.

The slot control unit 43 determines the slot size to be $2^n$ (n is an integer) times larger than a predetermined data size. This may facilitate determination of the slot size in accordance with the size of write data.

The storage devices 21 store mapping information associating an LBA with a slot number for each predetermined data size, and slot management information associating, for each slot size, the slot number with a reference value indicating the number of LBAs referring to the slot number. The block map control unit 42, the slot control unit 43, the actual data control unit 44, and the hash control unit 45 perform the deduplication processing and the write data processing by using the mapping information and the slot management information stored in the storage devices 21. Accordingly, the deduplication processing and the write data processing may be efficiently performed.

The mapping information includes an offset value provided to the slot number. The block map control unit 42, the slot control unit 43, the actual data control unit 44, and the hash control unit 45 specify a position referred to by an LBA in the slot number based on the offset value. Accordingly, block mapping may be performed when the size of one LBA block is different from the size of one slot.

When a value specifying the slot size in the slot management information is larger than the reference value, the block map control unit 42 changes a slot number referred to by the corresponding LBA. The slot control unit 43 performs control to determine the slot size for the changed slot number. Accordingly, slot size optimization may be achieved when the slot size is excessively allocated through data update.

When an LBA having a slot number same as that of the LBA of a data writing region is continuous with the LBA of the data writing region, the block map control unit 42 and the slot control unit 43 change a slot number and determine the slot size at the changed slot number, respectively. Thus, block map control unit 42 and the block map control unit 43 do not have to read the entire range of LBAs in the slot size optimization processing and may complete the slot size optimization processing fast.

[C] Modification

In the above-described exemplary embodiment, the slot size is set to be $2^n$ times larger than the basic data size, but the present disclosure is not limited thereto. For example, the slot size may be an integral multiple of the basic data size.

FIG. 19 is a diagram exemplarily illustrating a slot size table 201a according to a modification of the exemplary embodiment.

Similarly to the slot size table 201 illustrated in FIG. 5, the slot size table 201a indicates a slot size usable in block mapping at the CM 10.

In the slot size table 201a illustrated in FIG. 19, "data size" is 4×p KB (p is an integer). As illustrated in FIG. 19, the range of values taken by p may be restricted by providing an upper limit value (in the illustrated example, 32 KB) to the data size (in the illustrated example, p=1, 2, 3, 4, 5, 6, 7, and 8). The integer p corresponds to "value" in the slot size table 201a.

The minimum data size among "data sizes" in the slot size table 201a may be referred to as a basic data size or a predetermined data size. The basic data size is multiplied by p as "magnification" in the slot size table 201a to calculate a data size may be set to each slot. In the example illustrated in FIG. 19, when the value p=1, the "magnification" is one and the "data size" is 4 KB. For example, when the value p=2, the "magnification" is two and the "data size" is 8 KB. When the value p=3, the "magnification" is three and the "data size" is 12 KB. When the value p=8, the "magnification" is eight and the "data size" is 32 KB.

The slot control unit 43 illustrated in FIG. 4 sets the data size of each slot by using information listed in the slot size table 201a. Information related to the slot size table 201a may be stored in the storage devices 21 illustrated in FIG. 3.

In this manner, in the modification of the exemplary embodiment, the slot control unit 43 functions as an exemplary determination unit configured to determine the slot size to be an integral multiple of a predetermined data size. Accordingly, such an effect that the slot size may be flexibly determined is achieved in addition to effects same as those of the above-described exemplary embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage system comprising:
a storage device; and
a processor coupled to the storage device and configured to:
receive first data;
specify one or more second data sizes in accordance with a first data size of the first data by rounding-up the first data size to a rounded-up size, which is a first integral multiple of a unit size, and selecting the one or more second data sizes corresponding to the rounded-up size using division information by setting the rounded-up size as the one or more second data sizes if the rounded-up size is equal to any value of $2^n$ multiplied by the unit size, where n is any integer, and setting a size obtained by subtracting a second integral multiple of the unit size from the rounded-up size and one or more additional sizes as the one or more second data sizes if the rounded-up size is not equal to any value of $2^n$ multiplied by the unit size, where n is any integer;
divide the first data into a plurality of first blocks based on the specified one or more second data sizes;
calculate a first hash value for each of the plurality of first blocks;
calculate a second hash value for second data, which is received and stored in the storage device before receiving the first data and has a same data size as the respective first blocks;
compare the first hash value and the second hash value;
store, in the storage device, the respective first blocks as another second data when the first hash value is not identical to the second hash value; and
count in a counter corresponding to the second data when the first hash value is identical to the second hash value.

2. The storage system according to claim 1, wherein the one or more second data sizes are an integer multiple of the unit size of a logical address of the second data.

3. The storage system according to claim 1, wherein the one or more second data sizes are $2^n$ (n is an integer) times the unit size of a logical address of the second data.

4. The storage system according to claim 3, wherein the processor is configured to:
obtain mapping information in which the logical address is associated with a slot number for the unit size;
obtain slot management information in which the slot number and a reference value indicating a number of logical addresses referring to the slot number are associated with each other for the unit size; and
store, in the storage device, the data included in a block by using the mapping information and the slot management information.

5. The storage system according to claim 4, wherein an offset value is associated with the slot number in the mapping information, and the processor is configured to specify, based on the offset value, a position in a slot referenced by the slot number to which the logical address refers.

6. The storage system according to claim 4, wherein the processor is configured to:
change, when the slot management information includes the slot number for which a value specifying the one or more second data sizes are larger than the reference value, a reference destination of the logical address referring to the slot number to another slot number; and determine the one or more second data sizes for the another slot number.

7. The storage system according to claim 6, wherein the processor is configured to determine the one or more second data sizes when a plurality of logical addresses referring to the slot number are continuous addresses.

8. A method for storing data to a storage device comprising:
receiving first data;
specifying one or more second data sizes in accordance with a first data size of the first data by rounding-up the first data size to a rounded-up size, which is a first integral multiple of a unit size, and selecting the one or more second data sizes corresponding to the rounded-up size using division information by setting the rounded-up size as the one or more second data sizes if the rounded-up size is equal to any value of $2^n$ multiplied by the unit size, where n is any integer, and setting a size obtained by subtracting a second integral multiple of the unit size from the rounded-up size and one or more additional sizes as the one or more second data sizes if the rounded-up size is not equal to any value of $2^n$ multiplied by the unit size, where n is any integer;
dividing the first data into a plurality of first blocks based on the specified one or more second data sizes;
calculating a first hash value for each of the plurality of first blocks;
calculating a second hash value for second data which is received and stored in the storage device before receiving the first data and has a same data size as the respective first blocks;
comparing the first hash value and the second hash value;
storing, in the storage device, the respective first blocks as another second data when the first hash value is not identical to the second hash value;
counting in a counter corresponding to the second data when the first hash value is identical to the second hash value;
obtaining mapping information in which the logical address is associated with a slot number for the unit size;
obtaining slot management information in which the slot number and a reference value indicating a number of logical addresses referring to the slot number are associated with each other for the unit size;
storing, in the storage device, the data included in a block by using the mapping information and the slot management information;
changing, when the slot management information includes the slot number for which a value specifying the one or more second data sizes are larger than the reference value, a reference destination of the logical address referring to the slot number to another slot number; and
determining the one or more second data sizes for the another slot number.

9. The method according to claim 8, further comprising determining the one or more second data sizes when a plurality of logical addresses referring to the slot number are continuous addresses.

10. A non-transitory computer-readable storage medium storing a program that causes an information processing apparatus to execute a process for storing data to a storage device, the process comprising:
receiving first data;
specifying one or more second data sizes in accordance with a first data size of the first data by rounding-up the first data size to a rounded-up size, which is a first integral multiple of a unit size, and selecting the one or more second data sizes corresponding to the rounded-up size using division information by setting the rounded-up size as the one or more second data sizes if the rounded-up size is equal to any value of $2^n$ multiplied by the unit size, where n is any integer, and setting a size obtained by subtracting a second integral multiple of the unit size from the rounded-up size and one or more additional sizes as the one or more second data sizes if the rounded-up size is not equal to any value of $2^n$ multiplied by the unit size, where n is any integer;
dividing the first data into a plurality of first blocks based on the specified one or more second data sizes;
calculating a first hash value for each of the plurality of first blocks;
calculating a second hash value for second data which is received and stored in the storage device before receiving the first data and has a same data size as the respective first blocks;
comparing the first hash value and the second hash value;
storing, in the storage device, the respective first blocks as another second data when the first hash value is not identical to the second hash value; and
counting in a counter corresponding to the second data when the first hash value is identical to the second hash value.

11. The non-transitory computer-readable storage medium according to claim 10, wherein the one or more second data sizes are an integer multiple of the unit size of a logical address of the second data.

12. The non-transitory computer-readable storage medium according to claim 10, wherein the one or more second data sizes are $2^n$ (n is an integer) times the unit size of a logical address of the second data.

13. The non-transitory computer-readable storage medium according to claim 12, further comprising:
obtaining mapping information in which the logical address is associated with a slot number for the unit size;
obtaining slot management information in which the slot number and a reference value indicating a number of logical addresses referring to the slot number are associated with each other for the unit size; and
storing, in the storage device, the data included in a block by using the mapping information and the slot management information.

14. The non-transitory computer-readable storage medium according to claim 13, wherein an offset value is associated with the slot number in the mapping information, and the process further comprises specifying, based on the offset value, a position in a slot referenced by the slot number to which the logical address refers.

15. The non-transitory computer-readable storage medium according to claim 13, the process further comprising:
changing, when the slot management information includes the slot number for which a value specifying the one or more second data sizes are larger than the reference value, a reference destination of the logical address referring to the slot number to another slot number; and
determining the one or more second data sizes for the another slot number.

* * * * *